(12) United States Patent
Padhye et al.

(10) Patent No.: US 8,862,517 B2
(45) Date of Patent: *Oct. 14, 2014

(54) DIGITAL RIGHTS MANAGEMENT OF CONTENT WHEN CONTENT IS A FUTURE LIVE EVENT

(75) Inventors: Tushar N. Padhye, Husur (IN); M. S. Roopa, Bangalore (IN); C. V. Joshi, Bangalore (IN); Basavaraj B. H., Bangalore (IN); Arun Ray, Bangalore (IN); Deepanjan Kanungo, Bangalore (IN); Aram Nahidipour, Laguna Niguel, CA (US); Xin Wang, Torrance, CA (US); Thanh Ta, Huntington Beach, CA (US); Michael Raley, Downey, CA (US); Guillermo Lao, Torrance, CA (US); Eddie Chen, Rancho Palos Verdes, CA (US); Bijan Tadayon, Germantown, MD (US); Anant Kansal, Bangalore (IN)

(73) Assignee: ContentGuard Holdings, Inc., Plano, TX (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/329,640

(22) Filed: Dec. 19, 2011

(65) Prior Publication Data
US 2012/0090018 A1    Apr. 12, 2012

Related U.S. Application Data

(63) Continuation of application No. 10/162,699, filed on Jun. 6, 2002, now Pat. No. 8,099,364, which is a continuation-in-part of application No. 09/867,747, filed on May 31, 2001, now Pat. No. 6,876,984.

(51) Int. Cl.
| | |
|---|---|
| *G06F 21/00* | (2013.01) |
| *G11B 20/00* | (2006.01) |
| *G06F 21/10* | (2013.01) |
| *H04L 29/08* | (2006.01) |
| *G06F 21/62* | (2013.01) |
| *H04L 29/06* | (2006.01) |

(52) U.S. Cl.
CPC ............ *H04L 63/10* (2013.01); *G11B 20/0071* (2013.01); *G06F 2221/2153* (2013.01); *G06F 21/10* (2013.01); *H04L 67/34* (2013.01); *G06F 2221/2141* (2013.01); *G06F 21/6209* (2013.01); *G11B 20/00086* (2013.01); *H04L 2463/102* (2013.01); *G11B 20/0021* (2013.01)
USPC .......................................... 705/59; 380/277

(58) Field of Classification Search
USPC ......................................................... 705/52
See application file for complete search history.

(56) References Cited

U.S. PATENT DOCUMENTS 3,263,158 A    7/1966 Janis (Continued)

FOREIGN PATENT DOCUMENTS

BR    9810967 A    10/2001

(Continued)

OTHER PUBLICATIONS

MS Windows Media Pay-Per-View Solution, Published: Jul. 23, 1999 by Bill Birney, Microsoft Corporation.

(Continued)

*Primary Examiner* — Evens J Augustin
(74) *Attorney, Agent, or Firm* — Marc S. Kaufman; Stephen M. Hertzler; Reed Smith LLP

(57) ABSTRACT

A method and system for managing use of items having usage rights associated therewith including a point of capture system adapted to generate content of a future event when the event occurs, a content distributor adapted to generate a rights label having usage rights associated with content of the future event before the content is created, the rights label having a distribution key for encrypting the content as the content is generated, the distribution key being encrypted with a public key. The system also includes a license server adapted to generate a license associate with the content from the rights label before the content is generated, the license including the distribution key encrypted with the public key, and a content distributor adapted to distribute the license before the content is generated.

30 Claims, 11 Drawing Sheets

(56) References Cited

U.S. PATENT DOCUMENTS

| | | |
|---|---|---|
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,200,700 A | 4/1980 | Mäder |
| 4,220,991 A | 9/1980 | Hamano et al. |
| 4,278,837 A | 7/1981 | Best |
| 4,323,921 A | 4/1982 | Guillou |
| 4,361,851 A | 11/1982 | Asip et al. |
| 4,423,287 A | 12/1983 | Zeidler |
| 4,429,385 A | 1/1984 | Cichelli et al. |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,621,321 A | 11/1986 | Boebert et al. |
| 4,644,493 A | 2/1987 | Chandra et al. |
| 4,652,990 A | 3/1987 | Pailen et al. |
| 4,658,093 A | 4/1987 | Hellman |
| 4,713,753 A | 12/1987 | Beobert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,817,140 A | 3/1989 | Chandra et al. |
| 4,827,508 A | 5/1989 | Shear |
| 4,868,376 A | 9/1989 | Lessin et al. |
| 4,888,638 A | 12/1989 | Bohn |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,162 A | 10/1991 | Santon et al. |
| 5,058,164 A | 10/1991 | Elmer et al. |
| 5,103,476 A | 4/1992 | Waite et al. |
| 5,113,519 A | 5/1992 | Johnson et al. |
| 5,129,083 A | 7/1992 | Cutler et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,174,641 A | 12/1992 | Lim |
| 5,183,404 A | 2/1993 | Aldous et al. |
| 5,191,193 A | 3/1993 | Le Roux |
| 5,204,897 A | 4/1993 | Wyman |
| 5,204,961 A | 4/1993 | Barlow |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,276,901 A | 1/1994 | Howell et al. |
| 5,287,408 A | 2/1994 | Samson |
| 5,291,596 A | 3/1994 | Mita |
| 5,293,422 A | 3/1994 | Loiacono |
| 5,301,231 A | 4/1994 | Abraham et al. |
| 5,311,591 A | 5/1994 | Fischer |
| 5,319,705 A | 6/1994 | Halter et al. |
| 5,335,275 A | 8/1994 | Millar et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,386,369 A | 1/1995 | Christiano |
| 5,390,297 A | 2/1995 | Barber et al. |
| 5,394,469 A | 2/1995 | Nagel et al. |
| 5,410,598 A | 4/1995 | Shear |
| 5,412,717 A | 5/1995 | Fischer |
| 5,414,852 A | 5/1995 | Kramer et al. |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,816 A | 4/1996 | Hamilton et al. |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,535,276 A | 7/1996 | Ganesan |
| 5,539,735 A | 7/1996 | Moskowitz |
| 5,553,143 A | 9/1996 | Ross et al. |
| 5,557,678 A | 9/1996 | Ganesan |
| 5,563,946 A | 10/1996 | Cooper et al. |
| 5,564,038 A | 10/1996 | Grantz et al. |
| 5,568,552 A | 10/1996 | Davis |
| 5,619,570 A | 4/1997 | Tsutsui |
| 5,621,797 A | 4/1997 | Rosen |
| 5,625,690 A | 4/1997 | Michel et al. |
| 5,629,980 A | 5/1997 | Stefik et al. |
| 5,633,932 A | 5/1997 | Davis et al. |
| 5,634,012 A | 5/1997 | Stefik et al. |
| 5,636,346 A | 6/1997 | Saxe |
| 5,638,443 A | 6/1997 | Stefik et al. |
| 5,638,513 A | 6/1997 | Ananda |
| 5,649,013 A | 7/1997 | Stuckey et al. |
| 5,655,077 A | 8/1997 | Jones et al. |
| 5,671,412 A | 9/1997 | Christiano |
| 5,708,709 A | 1/1998 | Rose |
| 5,708,717 A | 1/1998 | Alasia |
| 5,715,403 A | 2/1998 | Stefik |
| 5,729,741 A | 3/1998 | Liaguno et al. |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,879 A | 4/1998 | Wyman |
| 5,748,783 A | 5/1998 | Rhoads |
| 5,757,907 A | 5/1998 | Cooper et al. |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,787,172 A | 7/1998 | Arnold |
| 5,790,664 A | 8/1998 | Coley et al. |
| 5,790,677 A | 8/1998 | Fox et al. |
| 5,812,664 A | 9/1998 | Bernobich et al. |
| 5,825,876 A | 10/1998 | Peterson |
| 5,825,879 A | 10/1998 | Davis |
| 5,825,892 A | 10/1998 | Braudaway et al. |
| 5,838,792 A | 11/1998 | Ganesan |
| 5,848,154 A | 12/1998 | Nishio et al. |
| 5,848,378 A | 12/1998 | Shelton et al. |
| 5,850,443 A | 12/1998 | Van Oorschot et al. |

(56) References Cited

U.S. PATENT DOCUMENTS

| | | | |
|---|---|---|---|
| 5,857,020 A * | 1/1999 | Peterson, Jr. | 705/52 |
| 5,862,325 A | 1/1999 | Reed et al. | |
| 5,870,473 A | 2/1999 | Boesch et al. | |
| 5,889,860 A | 3/1999 | Eller et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,925,127 A | 7/1999 | Ahmad | |
| 5,933,498 A | 8/1999 | Schneck et al. | |
| 5,940,504 A | 8/1999 | Griswold | |
| 5,943,422 A | 8/1999 | Van Wie et al. | |
| 5,949,876 A | 9/1999 | Ginter et al. | |
| 5,968,175 A | 10/1999 | Morishita et al. | |
| 5,982,891 A | 11/1999 | Ginter et al. | |
| 5,983,207 A | 11/1999 | Turk et al. | |
| 5,987,134 A | 11/1999 | Shin et al. | |
| 5,999,624 A | 12/1999 | Hopkins | |
| 5,999,949 A | 12/1999 | Crandall | |
| 6,006,332 A | 12/1999 | Rabne et al. | |
| 6,009,401 A | 12/1999 | Horstmann | |
| 6,020,882 A | 2/2000 | Kinghorn et al. | |
| 6,047,067 A | 4/2000 | Rosen | |
| 6,056,786 A | 5/2000 | Rivera et al. | |
| 6,073,124 A | 6/2000 | Krishnan et al. | |
| 6,073,234 A | 6/2000 | Kigo et al. | |
| 6,088,717 A | 7/2000 | Reed et al. | |
| 6,091,777 A | 7/2000 | Guetz et al. | |
| 6,105,134 A | 8/2000 | Pinder et al. | |
| 6,112,181 A | 8/2000 | Shear et al. | |
| 6,112,239 A | 8/2000 | Kenner et al. | |
| 6,115,471 A | 9/2000 | Oki et al. | |
| 6,135,646 A | 10/2000 | Kahn et al. | |
| 6,138,119 A | 10/2000 | Hall et al. | |
| 6,141,754 A | 10/2000 | Choy | |
| 6,157,719 A | 12/2000 | Wasilewski et al. | |
| 6,157,721 A | 12/2000 | Shear et al. | |
| 6,169,976 B1 | 1/2001 | Colosso | |
| 6,185,683 B1 | 2/2001 | Ginter et al. | |
| 6,189,037 B1 | 2/2001 | Adams et al. | |
| 6,189,146 B1 | 2/2001 | Misra et al. | |
| 6,192,165 B1 | 2/2001 | Irons | |
| 6,209,092 B1 | 3/2001 | Linnartz | |
| 6,209,787 B1 | 4/2001 | Iida | |
| 6,216,112 B1 | 4/2001 | Fuller et al. | |
| 6,219,652 B1 | 4/2001 | Carter et al. | |
| 6,226,618 B1 | 5/2001 | Downs et al. | |
| 6,233,684 B1 | 5/2001 | Stefik et al. | |
| 6,236,971 B1 | 5/2001 | Stefik et al. | |
| 6,237,786 B1 | 5/2001 | Ginter et al. | |
| 6,240,185 B1 | 5/2001 | Van Wie et al. | |
| 6,246,767 B1 | 6/2001 | Akins et al. | |
| 6,252,964 B1 | 6/2001 | Wasilewski et al. | |
| 6,253,193 B1 | 6/2001 | Ginter et al. | |
| 6,263,313 B1 | 7/2001 | Milsted et al. | |
| 6,286,103 B1 * | 9/2001 | Maillard et al. | 726/26 |
| 6,289,455 B1 * | 9/2001 | Kocher et al. | 713/194 |
| 6,292,568 B1 | 9/2001 | Akins et al. | |
| 6,292,569 B1 | 9/2001 | Shear et al. | |
| 6,301,660 B1 | 10/2001 | Benson | |
| 6,307,939 B1 | 10/2001 | Vigarie | |
| 6,311,214 B1 | 10/2001 | Rhoads | |
| 6,327,652 B1 | 12/2001 | England et al. | |
| 6,330,670 B1 | 12/2001 | England et al. | |
| 6,345,256 B1 | 2/2002 | Milsted et al. | |
| 6,345,288 B1 | 2/2002 | Reed et al. | |
| 6,353,888 B1 | 3/2002 | Kakehi et al. | |
| 6,363,488 B1 | 3/2002 | Ginter et al. | |
| 6,385,596 B1 * | 5/2002 | Wiser et al. | 705/51 |
| 6,389,402 B1 | 5/2002 | Ginter et al. | |
| 6,389,403 B1 | 5/2002 | Dorak, Jr. | |
| 6,389,538 B1 | 5/2002 | Gruse et al. | |
| 6,397,333 B1 | 5/2002 | Sohne et al. | |
| 6,398,245 B1 | 6/2002 | Gruse et al. | |
| 6,401,211 B1 | 6/2002 | Brezak, Jr. et al. | |
| 6,405,369 B1 | 6/2002 | Tsuria | |
| 6,418,421 B1 | 7/2002 | Hurtado et al. | |
| 6,421,358 B1 * | 7/2002 | Stimmel et al. | 370/489 |
| 6,424,717 B1 | 7/2002 | Pinder et al. | |
| 6,424,947 B1 | 7/2002 | Tsuria et al. | |
| 6,434,535 B1 | 8/2002 | Kupka et al. | |
| 6,442,549 B1 | 8/2002 | Schenider | |
| 6,487,659 B1 | 11/2002 | Kigo et al. | |
| 6,516,052 B2 | 2/2003 | Voudouris | |
| 6,516,412 B2 | 2/2003 | Wasilewski et al. | |
| 6,516,413 B1 | 2/2003 | Aratani et al. | |
| 6,523,113 B1 | 2/2003 | Wehrenberg | |
| 6,523,745 B1 | 2/2003 | Tamori | |
| 6,526,508 B2 | 2/2003 | Akins et al. | |
| 6,560,340 B1 | 5/2003 | Akins et al. | |
| 6,574,609 B1 | 6/2003 | Downs et al. | |
| 6,581,161 B1 | 6/2003 | Byford | |
| 6,587,837 B1 | 7/2003 | Spagna et al. | |
| 6,611,812 B2 | 8/2003 | Hurtado et al. | |
| 6,796,555 B1 | 9/2004 | Blahut | |
| 6,834,110 B1 | 12/2004 | Marconcini et al. | |
| 6,853,728 B1 * | 2/2005 | Kahn et al. | 380/239 |
| 6,859,791 B1 | 2/2005 | Spagna et al. | |
| 6,904,522 B1 | 6/2005 | Benardeau et al. | |
| 6,959,288 B1 | 10/2005 | Medina et al. | |
| 6,973,458 B1 | 12/2005 | Maeda et al. | |
| 6,983,371 B1 | 1/2006 | Hurtado et al. | |
| 6,996,720 B1 * | 2/2006 | DeMello et al. | 713/189 |
| 7,017,188 B1 * | 3/2006 | Schmeidler et al. | 726/26 |
| 7,080,139 B1 | 7/2006 | Briggs et al. | |
| 7,158,953 B1 * | 1/2007 | DeMello et al. | 705/51 |
| 7,213,261 B1 | 5/2007 | Gomez et a | |
| 7,240,359 B1 * | 7/2007 | Sie et al. | 725/88 |
| 7,467,212 B2 | 12/2008 | Adams et al. | |
| 7,484,246 B2 | 1/2009 | Matsuyama et al. | |
| 2001/0001014 A1 | 5/2001 | Akins et al. | |
| 2001/0009026 A1 | 7/2001 | Terao et al. | |
| 2001/0010045 A1 | 7/2001 | Stefik et al. | |
| 2001/0010046 A1 | 7/2001 | Muyres et al. | |
| 2001/0011276 A1 | 8/2001 | Durst, Jr. et al. | |
| 2001/0014206 A1 | 8/2001 | Artigalas et al. | |
| 2001/0023417 A1 | 9/2001 | Stefik et al. | |
| 2001/0037467 A1 | 11/2001 | O'Toole, Jr. et al. | |
| 2001/0039659 A1 | 11/2001 | Simmons et al. | |
| 2001/0042016 A1 | 11/2001 | Muyres et al. | |
| 2001/0044782 A1 | 11/2001 | Hughes et al. | |
| 2001/0046299 A1 | 11/2001 | Wasilewski et al. | |
| 2001/0049824 A1 * | 12/2001 | Baker et al. | 725/109 |
| 2001/0054026 A1 | 12/2001 | Choate | |
| 2001/0056405 A1 | 12/2001 | Muyres et al. | |
| 2002/0001387 A1 | 1/2002 | Dillon | |
| 2002/0002488 A1 | 1/2002 | Muyres et al. | |
| 2002/0004744 A1 | 1/2002 | Muyres et al. | |
| 2002/0004779 A1 | 1/2002 | Turk et al. | |
| 2002/0010917 A1 * | 1/2002 | Srikantan et al. | 725/1 |
| 2002/0035618 A1 | 3/2002 | Mendez et al. | |
| 2002/0044658 A1 | 4/2002 | Wasilewski et al. | |
| 2002/0049717 A1 * | 4/2002 | Routtenberg et al. | 707/1 |
| 2002/0051407 A1 * | 5/2002 | Griner et al. | 369/1 |
| 2002/0056118 A1 | 5/2002 | Hunter et al. | |
| 2002/0069282 A1 | 6/2002 | Reisman | |
| 2002/0071556 A1 | 6/2002 | Moskowitz et al. | |
| 2002/0077984 A1 | 6/2002 | Ireton | |
| 2002/0083006 A1 | 6/2002 | Headings et al. | |
| 2002/0099948 A1 | 7/2002 | Kocher et al. | |
| 2002/0116471 A1 | 8/2002 | Shteyn | |
| 2002/0127423 A1 | 9/2002 | Kayanakis | |
| 2002/0128972 A1 | 9/2002 | Stefik et al. | |
| 2002/0143565 A1 | 10/2002 | Headings et al. | |
| 2002/0154157 A1 * | 10/2002 | Sherr et al. | 345/716 |
| 2002/0161473 A1 | 10/2002 | Higuchi et al. | |
| 2002/0162104 A1 * | 10/2002 | Raike et al. | 725/31 |
| 2002/0170053 A1 * | 11/2002 | Peterka et al. | 725/31 |
| 2002/0184158 A1 | 12/2002 | Tadayon et al. | |
| 2003/0023564 A1 | 1/2003 | Padhye et al. | |
| 2003/0046238 A1 | 3/2003 | Nonaka et al. | |
| 2003/0097567 A1 | 5/2003 | Terao et al. | |
| 2003/0105718 A1 | 6/2003 | Hurtado et al. | |

(56) References Cited

U.S. PATENT DOCUMENTS

| | | | |
|---|---|---|---|
| 2003/0135464 A1 | 7/2003 | Mourad et al. | |
| 2003/0161473 A1* | 8/2003 | Fransdonk | 380/277 |
| 2004/0015437 A1 | 1/2004 | Choi et al. | |
| 2004/0024688 A1 | 2/2004 | Bi et al. | |
| 2004/0052370 A1 | 3/2004 | Katznelson | |
| 2004/0172552 A1 | 9/2004 | Boyles et al. | |
| 2007/0244812 A1 | 10/2007 | Turk et al. | |
| 2010/0106659 A1 | 4/2010 | Stefik et al. | |

FOREIGN PATENT DOCUMENTS

| | | |
|---|---|---|
| EP | 0 067 556 B1 | 12/1982 |
| EP | 0 084 441 | 7/1983 |
| EP | 0 180 460 | 5/1986 |
| EP | 0 257 585 A2 | 3/1988 |
| EP | 0 262 025 A2 | 3/1988 |
| EP | 0 332 304 A2 | 9/1989 |
| EP | 0 332 707 | 9/1989 |
| EP | 0 393 806 A2 | 10/1990 |
| EP | 0398492 A2 | 11/1990 |
| EP | 0 450 841 A2 | 10/1991 |
| EP | 0 529 261 A2 | 3/1993 |
| EP | 0588415 A1 | 3/1994 |
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 725 376 | 8/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 3-063717 A | 3/1991 |
| JP | 4180451 | 6/1992 |
| JP | H4-180451 | 6/1992 |
| JP | 04-369068 | 12/1992 |
| JP | 5-100939 | 4/1993 |
| JP | 5168039 A2 | 7/1993 |
| JP | 05-268415 | 10/1993 |
| JP | 6-131371 A | 5/1994 |
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |
| JP | 0 715 241 | 6/1996 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2000-322352 | 11/2000 |
| JP | 2000341634 A | 12/2000 |
| JP | 2001-318997 A | 11/2001 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |
| WO | WO 92/20022 A1 | 11/1992 |
| WO | WO 93/01550 | 1/1993 |
| WO | WO 93/01550 A1 | 1/1993 |
| WO | WO 93/11480 A1 | 6/1993 |
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/42098 | 9/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/49615 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/09703 A1 | 2/2001 |
| WO | WO 01/37209 A1 | 5/2001 |
| WO | WO 01/63528 | 8/2001 |
| WO | 03098398 A2 | 11/2003 |
| WO | 2004006054 A2 | 1/2004 |
| WO | WO 2004/034223 A2 | 4/2004 |
| WO | WO 2004/103843 | 12/2004 |

OTHER PUBLICATIONS

Final Office Action dated Apr. 5, 2012 cited in U.S. Appl. No. 11/730,972.

Kohl, John T. et al., "The Evolution of the Kerberos Authentication Service", Distributed Open Systems, IEEE, 1994, 18 pages.

Lampson et al., Authentication in Distributed Systems: Theory and Practice, ACM, 1992, pp. 1-47.

Motoike, Sachiko, "Content Distribution Service Using DVD-ROM", Matsushita Technical Journal, Japan, Oct. 18, 1998, vol. 44, No. 5, pp. 25-33.

Delaigle, "Digital Watermarking," Spie Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2-3, 1993).

Johnson et al., "A Secure Distributed Capability Based System," Proceedings of the 1985 ACM Annual Conference on the Range of Computing: Mid-80's Perspective: Mid-80's Perspective *Association for Computing Machinery* pp. 392-402 (1985).

Blaze et al, "Divertible Protocols and Atomic Proxy Cryptography" 1998 Advances in Cryptography—Euro Crypt International Conference on the Theory and Application of Crypto Techniques, Springer Verlag, DE.

Blaze et al, "Atomic Proxy Cryptography" Draft (Online) (Nov. 2, 1997) XP002239619 Retrieved from the Internet.

(56) References Cited

OTHER PUBLICATIONS

No Author, "Capability- and Object-Based Systems Concepts," Capability-Based Computer Systems, pp. 1-19 (no date).
Cox, "Superdistribution" Wired Magazine (Sep. 1994) XP002233405 URL:http://www.wired.com/wired/archive/2.09/superdis_pr.html>.
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).
Iannella, ed., Open Digital Rights Language (ODRL), pp. 1-31 (Nov. 21, 2000).
Kahle, wais.concepts.txt, Wide Area Information Server Concepts, Thinking Machines Version 4, Draft, pp. 1-18 (Nov. 3, 1989).
Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.
Kahn et al, "The Digital Library Project, vol. 1: The World of Knowbots (Draft), an Open Architecture for a Digital Library System and a Plan for its Development," Corporation for National Research Initiatives, pp. 1-48 (Mar. 1988).
Kohl et al, Network Working Group Request for Comments: 1510, pp. 1-112 (Sep. 1993).
Lee et al, CDMA Systems Engineering Handbook (1998) [excerpts but not all pages numbered].
Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.
Mambo and Okamoto, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.
Microsoft Word, Users Guide, Version 6.0, pp. 487-489, 549-555, 560-564, 572-575, 599-613, 616-631 (1993).
Ojanperä and Prasad, eds., Wideband CDMA for Third Generation Mobile Communications (1998) [excerpts but not all pages numbered].
Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).
Raggett, (Hewlett Packard), "HTML+(Hypertext markup language)," pp. 1-31 (Jul. 12, 1993) URL:http://citeseer.ist.psu.edu/correct/340709.
Samuelson et al, "Intellectual Property Rights for Digital Library and Hypertext Publishing Systems: An Analysis of Xanadu," Hypertext '91 Proceedings, pp. 39-50 (Dec. 1991).
No Author, "Softlock Services Introduces . . . Softlock Services" Press Release (Jan. 28, 1994).
No Author, "Appendix III—Compatibility with HTML," No Title, pp. 30-31 (no date).
No Editor, No Title, Dictionary pages, pp. 469-472, 593-594 (no date).
Benoit, Digital Television MPEG-1, MPEG-2 and Principles of the DVB System, pp. 75-80, 116-121 (no date).
Benoit, Digital Television MPEG-1, MPEG-2 and Principles of the DVB System, $2^{nd}$ edition, pp. 74-80 (no date).
AH Digital Audio and Video Series, "DTV Receivers and Measurements," Understanding Digital Terrestrial Broadcasting, pp. 159-164 (no date).
O'Driscoll, The Essential Guide to Digital Set-Top Boxes and Interactive TV, pp. 6-24 (no date).
IUS Mentis, "The ElGamal Public Key System," pp. 1-2 (Oct. 1, 2005) online at http://www.iusmentis.com/technology/encyrption/elgamal/.
Schneier, "Crypto Bibliography," Index of Crypto Papers Available Online, pp. 1-2 (online) (no date).
No Author, No Title, pp. 344-355 (no date).
No Author, "Part Four Networks," No Title, pp. 639-714 (no date).
Microsoft Word User's Guide, pp. 773-774, 315-316, 487-489, 561-564, 744, 624-633 (1993).
No Author, "What is the ElGamal Cryptosystem," p. 1 (Nov. 27, 2006) online at http://www.x5.net/faqs/crypto/q29.html.
Johnson et al., "A Secure Distributed Capability Based System," ACM, pp. 392-402 (1985).
Wikipedia, "El Gamal Encyption," pp. 1-3 (last modified Nov. 2, 2006) online at http://en.wikipedia.org/wiki/ElGamal_encryption.
Blaze, "Atomic Proxy Cryptography," p. 1 Abstract (Oct. 20, 1998).
Blaze, "Matt Blaze's Technical Papers," pp. 1-6 (last updated Aug. 6, 2006)].
Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).
Corporation for National Research Initiatives, "Digital Object Architecture Project", http://www.nnri.reston.va.us/doa.html (updated Nov. 28, 2006).
Stefik, Summary and Analysis of A13 (Kahn, Robert E and Vinton G Cerf, "The Digital Library Project, vol. 1: The World of Knowbots (Draft), An Open Architecture for a Digital Library System and a Plan for its Development," Corporation for National Research Initiatives (Mar. 1988)), pp. 1-25 (May 30, 2007).
International Search Report issued in corresponding Application No. PCT/US05/00337 mailed Aug. 24, 2007.
Henry H. Perritt, Jr., "Technological Strategies for Protecting Intellectual Property in the Networked Multmedia Enviroment", Apr. 2-3, 1993, Knowbots, Permissions Headers & Contract Law.
"National Semiconductor and EPR Partner for Information Metering/Data Security Cards" Mar. 4, 1994, Press Release from Electronic Publishing Resources, Inc.
Weber, R., "Digital Rights Management Technology" Oct. 1995.
Flasche, U. et al, "Decentralized Processing of Documents", pp. 119-131, 1986, Comput. & Graphics, vol. 10, No. 2.
Mori, R. et al., "Superdistribution: The Concept and the Architecture", pp: 1133-1146, 1990, The Transactions of the IEICE, vol. E 73, No. 7, Tokyo, JP.
Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Guard", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.
Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue 1.

(56) References Cited

OTHER PUBLICATIONS

Sirbu, M., "Internet Billing Service Design and prototype Implementation", pp. 67-80, Jan. 1994, IMA Intellectual Property Project Proceedings, vol. 1, Issue 1.

Simmel, S. et al., "Metering and Licensing of Resources: Kala's General Purpose Approach", pp. 81-110, Jan. 1994, IMA Intellectual Property Project Proceedings, vol. 1, Issue 1.

Kahn, R., "Deposit, Registration and Recordation in an Electronic Copyright Management System", pp. 111-120, Jan. 1994, IMA Intellectual Property Project Proceedings, vol. 1, Issue 1.

Tygar, J. et al., "Dyad: A System for Using Physically Secure Coprocessors", pp. 121-152, Jan. 1994, IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.

Nelson, T., "A Publishing and Royalty Model for Networked Documents", pp. 257-259, Jan. 1994, IMA Intellectual Property Project Proceedings, vol. 1, Issue 1.

Robinson, E., "Redefining Mobile Computing", pp. 238-240, 247-248 and 252, Jul. 1993, PC Computing.

Abadi, M. et al., "Authentication and Delegation with Smart-cards", 1990, Research Report DEC Systems Research Center.

Mark Stefik, "Letting Loose the Light: Igniting Commerce in Electronic Publication", pp. 219-253, 1996, Internet Dreams: Archetypes, Myths, and Metaphors, IDSN 0-262-19373-6.

Mark Stefik, "Letting Loose the Light: Igniting Commerce in Electronic Publication", pp. 2-35, Feb. 8, 1995, Internet Dreams: Archetypes, Myths and Metaphors.

PDF Reference (Second Edition), Adobe Portable Document Format, Version 1.3, Adobe Systems Incorporated, 1985-2000, Addison-Wesley.

Adobe Acrobat 2.0, Information Products Group, Adobe Systems Incorporated, 1994.

\* cited by examiner

DIGITAL RIGHTS MANAGEMENT OF CONTENT WHEN CONTENT IS A FUTURE LIVE EVENT

RELATED APPLICATION DATA

This application is a Continuation of U.S. patent application Ser. No. 10/162,699, filed Jun. 6, 2002, now allowed, which is a Continuation-In-Part of U.S. patent application Ser. No. 09/867,747, filed May 31, 2001, now U.S. Pat. No. 6,876,984, and also claims benefit from U.S. Provisional Patent Application Nos. 60/296,114, filed Jun. 7, 2001, 60/296,116, filed Jun. 7, 2001, and 60/297,239, filed Jun. 12, 2001, the disclosures of which are incorporated herein by reference.

BACKGROUND OF THE INVENTION

1. Field of the Invention

The present invention is directed generally to managing use of digital content. In particular, this invention relates to establishing usage rights for controlling such use before the content is created, and distributing licenses to allow use of the content when the content is created.

2. Description of Related Art

One of the most important issues impeding the widespread distribution of digital works via electronic means, and the Internet in particular, is the current lack of protection of intellectual property rights of content owners during the distribution and the usage of the digital content. Efforts to resolve these issues have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management" ("DRM") herein.

Due to the expansion of the Internet in the recent years, and the issues relating to privacy, authentication, authorization, accounting, payment and financial clearing, rights specification, rights verification, rights enforcement, document protection, and collection of licensing fees DRM has become even more important. Because the Internet is such a widely used network whereby many computer users communicate and trade ideas and information, the freedom at which electronically published works are reproduced and distributed is widespread and commonplace.

Two basic types DRM of schemes have been employed to attempt to solve the document protection problem: secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as IBM's CRYPTOLOPEST™ and InterTrust's DIGIBOXES™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems such as PC and workstations using browsers to access the Web, will be the dominant systems used to access digital works. In this sense, existing computing environments such as PCs and workstations equipped with popular operating systems (e.g., Windows™, Linux™, and UNIX) and rendering applications such as browsers are not trusted systems and cannot be made trusted without significantly altering their architectures. Of course, alteration of the architecture defeats a primary purpose of the Web, i.e. flexibility and compatibility.

U.S. Pat. Nos. 5,530,235, 5,634,012, 5,715,403, 5,638,443, and 5,629,980 introduced many basic concepts of DRM. The disclosures of all of these patents are hereby incorporated herein by reference in their entirety. For example, U.S. Pat. No. 5,634,012 discloses a system for controlling the distribution of digital works. Each rendering device has a repository associated therewith. A predetermined set of usage transaction steps define a protocol used by the repositories for carrying out usage rights associated with the content. Usage rights are encapsulated with the content or otherwise associated with the digital content to travel with the content. The usage rights can permit various types of use such as, viewing only, use once, distribution, and the like. Rights can be granted based on payment or other conditions.

In conventional DRM techniques, a content owner, or other authorized party, specifies the rights after the content has been created and protects, e.g. encrypts, the content at the same time. A private key is used to encrypt the content, and a label is generated which specifies the usage rights. The rights label and the protected content are then associated and stored. A license to the content can later be generated for a user to permit the user to use or access the content. The license can include a private key which has been encrypted using a public key in known manner.

To access the content, the private key can be used to decrypt the encrypted public key, allowing the user to decrypt the content. This technique works well if the content is available at the time of the rights specification. However, this technique breaks-down if one wants to specify rights for content and issue a license for the content before the content is available. For example, a distributor of streaming video to a live future event, or of photographs to a future event, may want to begin selling licenses to the content prior to the event. Conventional DRM systems fall short of presenting processes for improving the security for works that are not yet in existence.

SUMMARY OF THE INVENTION

A first aspect of the invention is a rights management system for managing use of content having usage rights associated therewith. The system comprises a point of capture system adapted to generate content of a future event when the event occurs. The system also comprises a content distributor adapted to generate a rights label having usage rights associated with content of the future event before the content is generated by the point of capture system, the rights label having a securing mechanism that secures the content when the content is generated. The system further comprises a license server adapted to store the rights label and to issue a license associated with the content from the rights label before the content is generated, the license including a mechanism for unlocking the securing mechanism, and where the content distributor is further adapted to distribute the license before the content is generated.

A second aspect of the invention is a method for managing use of content having usage rights associated therewith. The method comprises the step of generating a rights label having usage rights associated with content of a future event before the content is generated by a point of capture system, the rights label having a securing mechanism for securing the content. The method also comprises the step of issuing a license associated with the content based on the rights label before the content is generated by the point of capture system, the license including a mechanism for unlocking the securing mechanism. The method further comprises the step of distributing the license before the content is generated.

DETAILED DESCRIPTION OF THE PREFERRED EMBODIMENT

The phrase "digital work" as used herein refers to any type of element having content in computer readable form. "Content" as used herein refers to the viewable or otherwise usable portion of a digital work. The phrase "usage rights" refers to manners of use which define permissions granted to a user of an existing digital work or a digital work to be created in the future with respect to use, access, distribution, and the like of the content of the work. In addition, one or more conditions may be specified which must be satisfied before the manners of use may be exercised.

Figure 1:
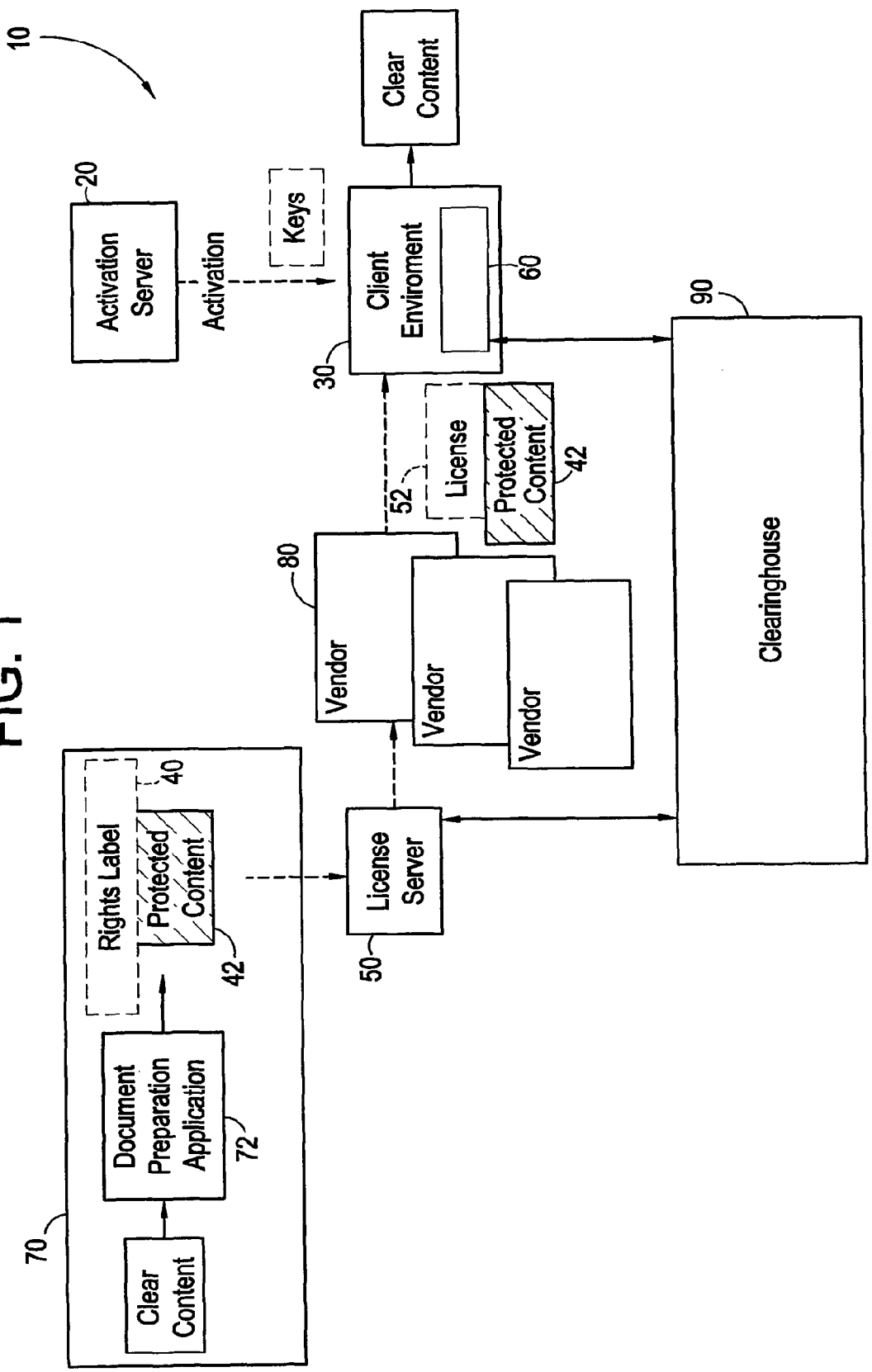
FIG. 1 is a schematic illustration of a DRM system.

A DRM system can be utilized to specify and enforce usage rights for items, such as digital content, goods or services. FIG. 1 illustrates a DRM system 10 that can be used to distribute digital content. DRM system 10 includes a user activation device, in the form of activation server 20, that issues public and private key pairs to content users in a protected fashion, as is well known. Typically, when a user goes through an activation process, some information is exchanged between activation server 20 and client environment 30, and software application 60 is downloaded and installed in client environment 30. Software application 60 serves as a security component and preferably is tamper resistant and contains the set of public and private keys issued by activation server 20 as well as other components such as any necessary engine for parsing or rendering protected content 42.

Rights label 40 is associated with protected content 42 and specifies usage rights that are available to an end-user when corresponding conditions are satisfied. License Server 50 manages the encryption keys and issues licenses 52 for exercise of usage rights in the manner set forth below. Licenses 52 embody the actual granting of usage rights to an end user based on usage rights selected from rights label 40. For example, rights label 40 may include usage rights for viewing protected 42 upon payment of a fee of five dollars and viewing or printing protected content 42 upon payment of a fee of ten dollars. Software application 60 interprets and enforces the usage rights that have been specified in license 52.

Figure 2:
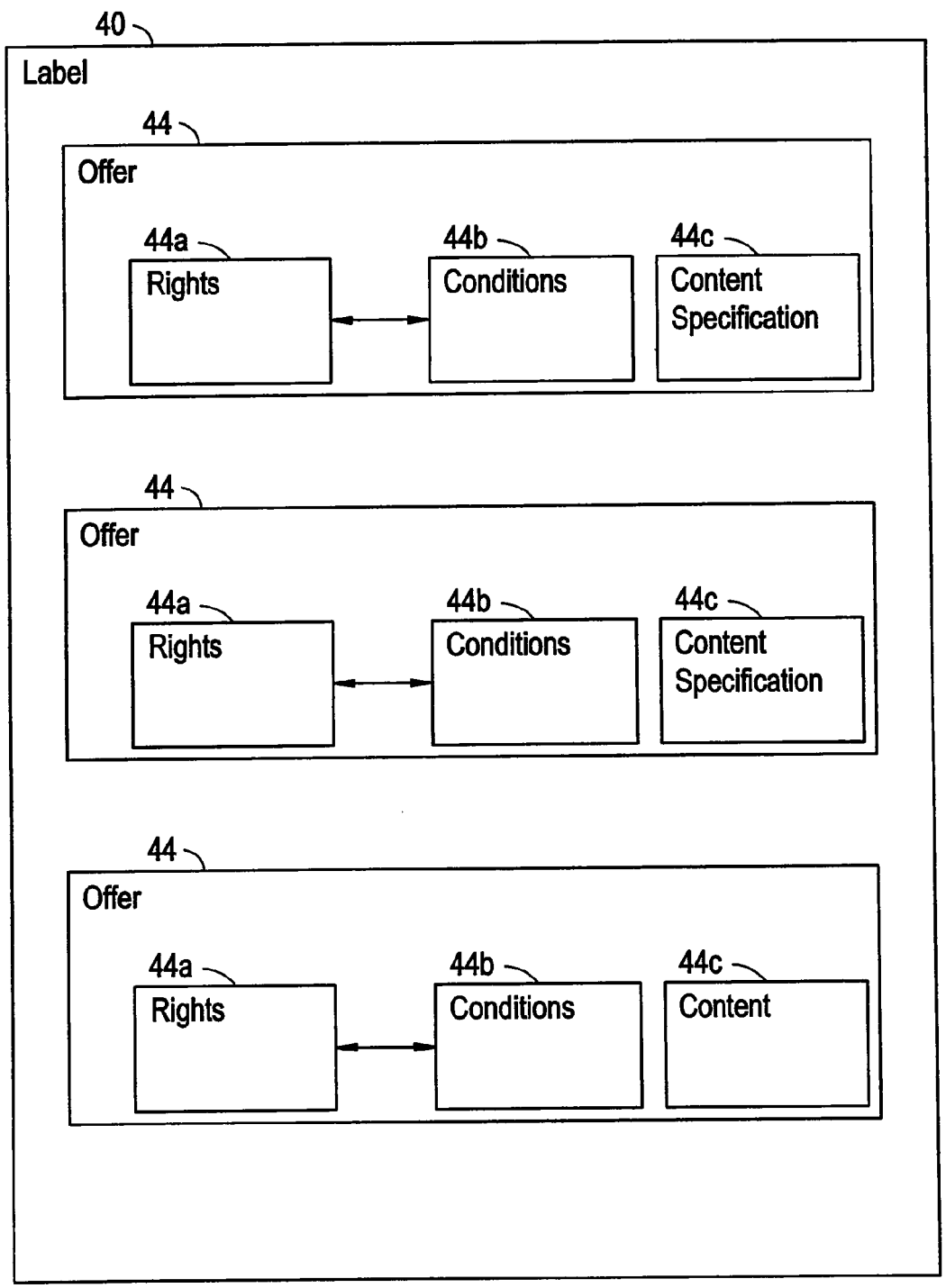
FIG. 2 is a schematic illustration of a rights label.

FIG. 2 illustrates rights label 40 in accordance with one embodiment. Rights label 40 includes plural rights offers 44. Each rights offer 44 includes usage rights 44a, conditions 44b, and content specification 44c. Content specification 44c can include any mechanism for referencing, calling, locating, or otherwise specifying protected content 42 associated with rights offer 44.

Figure 3:
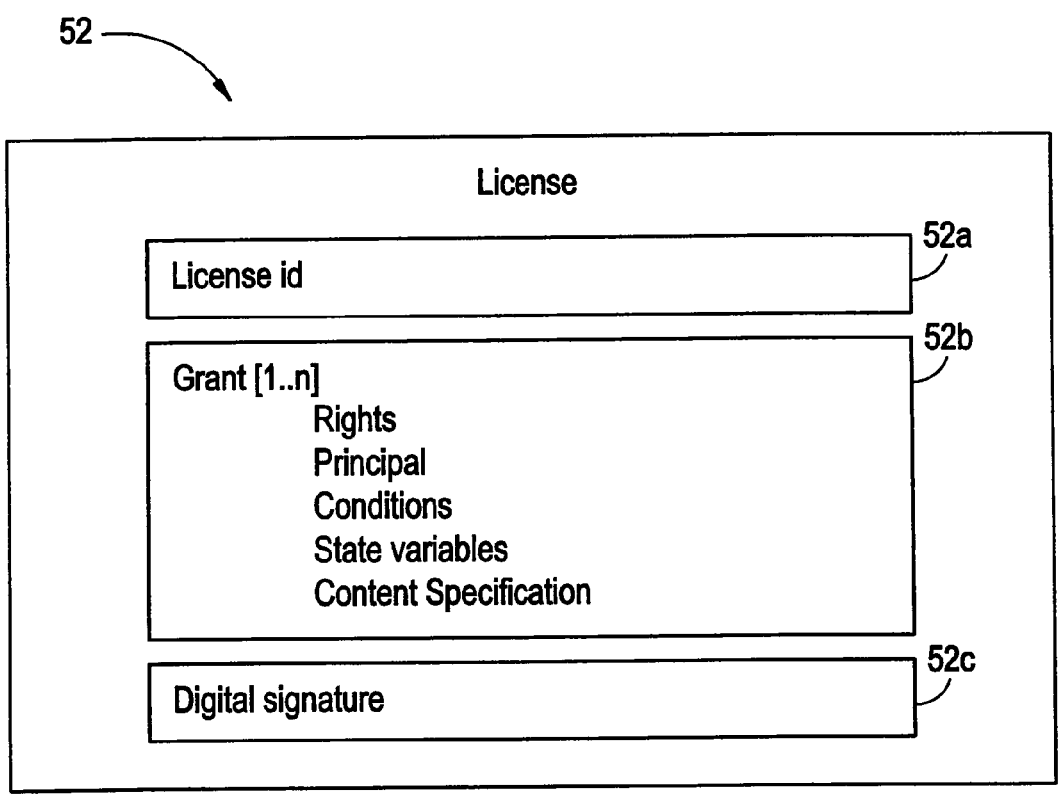
FIG. 3 is a schematic illustration of a license.

FIG. 3 illustrates license 52 in accordance with one embodiment. License 52 includes a unique license ID 52a and grant 52b including usage rights, a principal, conditions, state variables, and a content specification designating an associated protected content 42. License 52 also includes digital signature 52c including any cryptographic keys or the like for unlocking protected content 42.

Usage rights specify manners of use. For example, a manner of use can include the ability to use protected content 42, in a specified way, such as printing viewing, distributing, or the like. Rights can also be bundled. Further, usage rights can specify transfer rights, such as distribution rights, or other derived rights. Such usage rights are referred to as "meta-rights". Meta-rights are the rights that one has to manipulate, modify, and/or derive other usage rights. Meta-rights can be thought of as usage rights to usage rights. Meta-rights can include rights to offer, grant, obtain, transfer, delegate, track, surrender, exchange, and revoke usage rights to/from others. Meta-rights can include the rights to modify any of the conditions associated with other rights. For example, a meta-right may be the right to extend or reduce the scope of a particular right. A meta-right may also be the right to extend or reduce the validation period of a right.

As noted above, conditions must be satisfied in order to exercise the manner of use in a specified usage right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Usage rights and conditions can exist as separate entities or can be combined. Rights and conditions can be associated with any item including, objects, classes, categories, and services, for which use, access, distribution, or execution is to be controlled, restricted, recorded, metered, charged, or monitored in some fashion to thereby define a property right.

Protected content 42 can be prepared with document preparation application 72 installed on computer 70 associated with a content distributor, a content service provider, or any other party. Preparation of protected content 42 consists of specifying the rights and conditions under which protected content 42 can be used by associating rights label 40 with protected content 42 and protecting protected content 42 with some crypto algorithm or other mechanism for preventing processing or rendering of protected content 42. A rights language such as XrML™ can be used to specify the rights and conditions in rights label 40. However, the rights and conditions can be specified in any manner. Accordingly, the process of specifying rights refers to any process for associating rights with protected content 42. Rights label 40 associated with protected content 42 and the encryption key used to encrypt protected content 42 can be transmitted to license server 50. Protected content 42 can be a human readable or computer readable content specifying an item, a text file, a code, a document, an audio file, a video file, a digital multimedia file, or any other content.

A typical workflow for DRM system 10 is described below. A user operating within client environment 30 is activated for receiving protected content 42 by activation server 20. This results in a public-private key pair (and some user/machine specific information) being downloaded to client environment 30 in the form of client software application 60 in a known manner. This activation process can be accomplished at any time prior to the issuing of a license.

When a user wishes to obtain a specific protected content 42, the user makes a request for protected content 42. For example, a user might browse a Web site running on Web server of vendor 80, using a browser installed in client environment 30, and request protected content 42. The user can examine rights offers in rights label 40 associated with protected content 42 and select the desired usage rights. During this process, the user may go through a series of steps possibly to satisfy conditions of the usage rights including a fee transaction or other transactions (such as collection of information). When the appropriate conditions and other prerequisites, such as the collection of a fee and verification that the user has been activated, are satisfied, vendor 80 contacts license server 50 through a secure communications channel, such as a channel using a Secure Sockets Layer (SSL). License server 50 then generates license 52 for protected content 42 and vendor 80 causing both protected content 42 and license 52 to be downloaded. License 52 includes the selected usage rights and can be downloaded from license server 50 or an associated device. Protected content 42 can be downloaded from a computer associated with vendor 80, a distributor, or another party.

Application 60 in client environment 30 will then proceed to interpret license 52 and allow the use of protected content 42 based on the rights and conditions specified in license 52. The interpretation and enforcement of usage rights and related systems and techniques are well known. The steps above may take place sequentially or approximately simultaneously or in various sequential order.

DRM system 10 addresses security aspects of protected content 42. In particular, DRM system 10 may authenticate license 52 that has been issued by license server 50. One way to accomplish such authentication is for application 60 to determine if licenses 52 can be trusted. In other words, application 60 has the capability to verify and validate the cryptographic signature, or other identifying characteristic, of license 52. Of course, the example above is merely one way to effect a DRM system. For example, license 52 and protected content 42 can be distributed from different entities. Clearinghouse 90 can be used to process payment transactions and verify payment prior to issuing a license. Whereas DRM system 10 effectively addresses security aspects of protected content 42, the system is operable only when protected content 42 is in existence. DRM system 10 cannot readily provide protection to content that is not yet in existence, such as a video stream for a future event.

Figure 4:
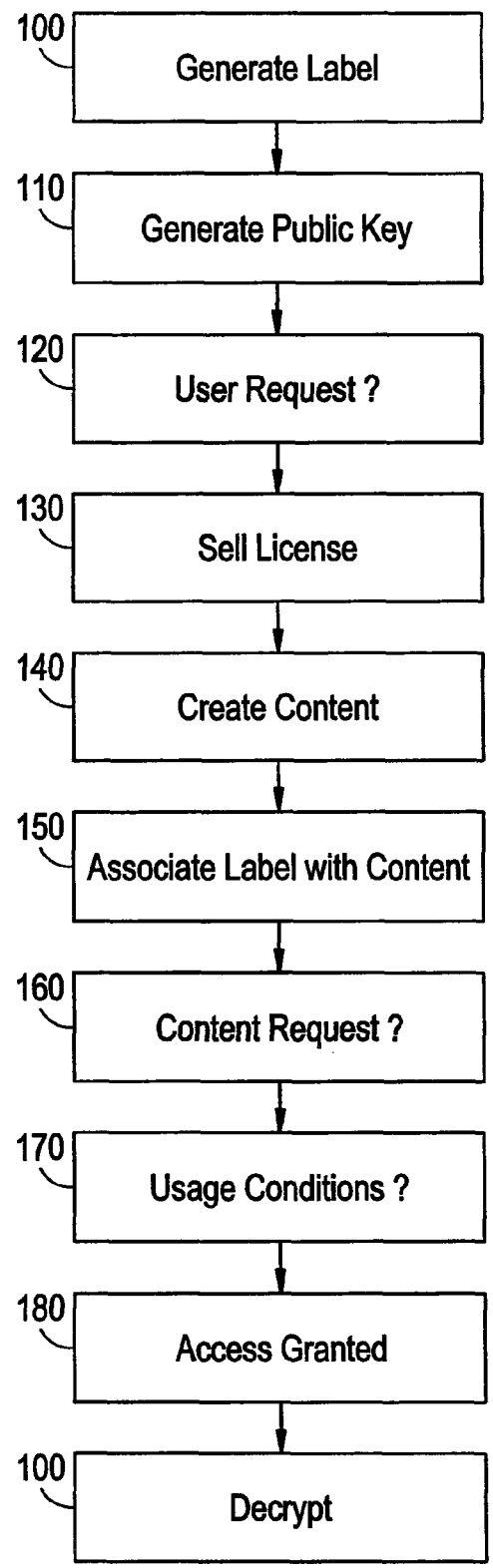
FIG. 4 is a flowchart of a method for providing usage rights for digital content before creation of the content in accordance with an embodiment of the invention.

FIG. 4 illustrates an embodiment of a method for providing usage rights for content of a digital work before the content is created. In step 100 a rights label specifying usage rights, to be associated with digital content that is not yet created, is generated. The rights label can include plural rights offers each specifying usage rights, such as the right to print, copy, alter, edit or view the digital work or any other right, permission, or restriction, such as those contained in the XrML™ language or other usage rights grammar. In the case of using the XrML™ language, the rights label can be an extensible markup language (XML) document specifying the usage rights. In addition, the future content can have many different versions of usage rights and thus a label can be generated for each version. In step 110, a key, such as a conventional public key, is generated in a known manner and associated with the rights label.

In step 120, a user request for a license to use the content to be created is received. The request can include a selection of one of the offers in the rights label. Keep in mind that the content itself need not be in existence yet. For example, the content can be a video recording or stream of a sporting event to occur in the future. In step 130, a distributor of the content, or another authorized party, issues a license to the user. The license can include a private key corresponding to the public key generated in step 110 and may include usage rights or other descriptive data. Once again, keep in mind that the content itself need not be in existence yet. Accordingly, the distributor is able to sell a license to view the event prior to the event.

In step 140, the content is created. Of course, this step can be accomplished by another party. However the content is created, the salient point in the preferred embodiment is that the content somehow comes into existence after rights are assigned for it. After the content is created, the license is associated with the content in step 150. The license can be encapsulated with the content. Alternatively, the license can be stored separately from the content but be associated through links, flags, calls, references or the like. Therefore, the term "associated" as used herein refers broadly to creating a correspondence between the content and the license so the license will be applied to the content. Once the license is associated with the content, the content is secured using the key generated in step 110. The digital content can be secured through any form of encryption or other known technique. For example pretty good privacy (PGP) encryption procedures can be used.

In step 160, the process determines whether there is a request for access to the secured digital content. If there are no requests, the process waits for a request. However, if there is a request for access, the process proceeds to step 170 where the usage rights associated with the digital work, i.e. usage rights in the license, are checked to determine whether all the conditions, such as payment, associated with the usage rights have been satisfied. If all the conditions have been satisfied, the process proceeds to step 180 in which access to the content is granted, i.e., the content is downloaded, streamed, or otherwise made accessible to the user. In step 190, the user's private key is used to decrypt the content in a known manner.

The association of the usage rights with the content may occur in a variety of ways. For example, if the usage rights will be the same for the entire content of a digital work, the usage rights can be attached when the digital work is processed for deposit in a distribution server or other device. However, if the content of the digital work has a variety of different usage rights for various components, the usage rights can be attached as the work is being created. Various authoring tools and/or digital work assembling tools can be utilized for providing an automated process of attaching the usage rights. Because each part of a digital work can have its own usage rights, there can be instances where the usage rights of a "part" will be different from its parent. As such, conflict rules can be established to dictate when and how a right may be exercised in a known manner.

Figure 5:
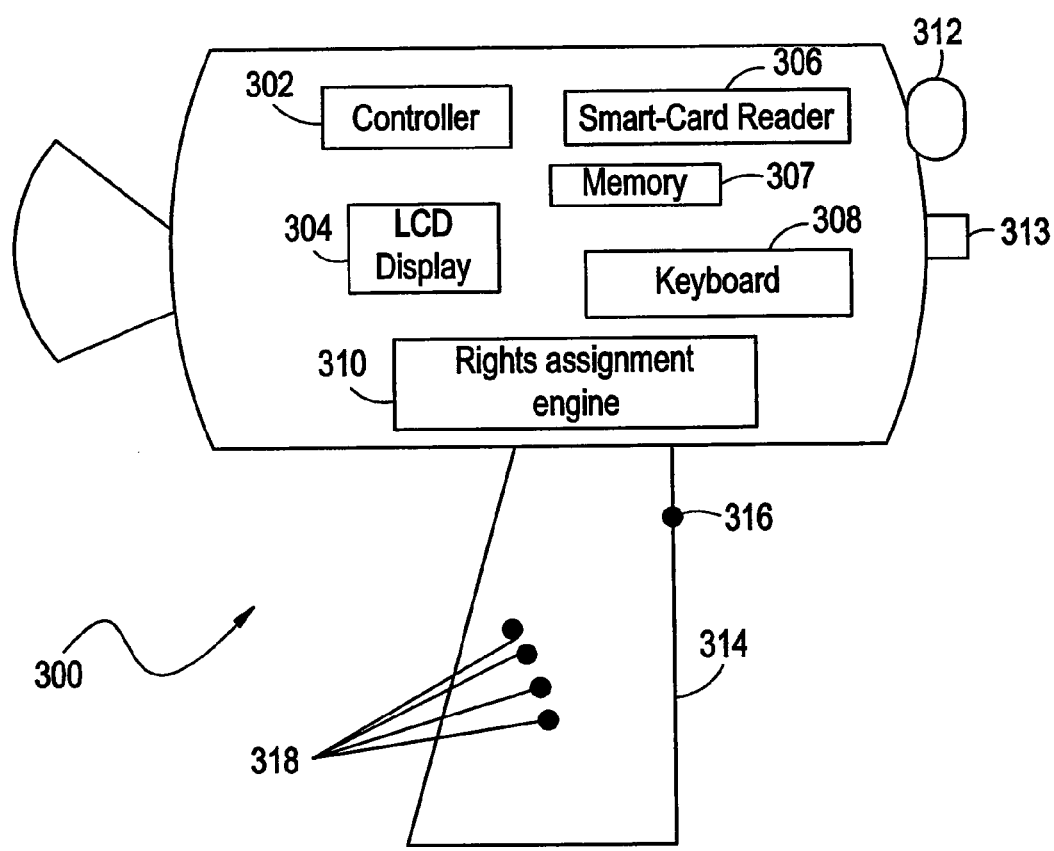
FIG. 5 is a content creation device for providing usage rights for digital content to be created in the future in accordance with an embodiment of the invention.

FIG. 5 illustrates a content creation device, a video recorder, in accordance with one aspect of the present invention. The content creation device 300 includes a controller 302, a LCD display 304, a smart-card reader 306, a memory 307, a keypad 308, a rights assignment engine 310, eye/iris recognition sensors 312, a cable connection 313, a handle 314, and symmetric finger print recognition sensors 316,318. Also, lens system 320 permits recording of video images. Controller 302 and rights assignment engine 310 of the illustrated embodiment are accomplished through a microprocessor based device programmed in a desired manner.

While FIG. 5 shows the controller 302 and the rights assignment engine 310 as separate units, the functions performed by these units may be combined in one processor or may be further divided among plural processors such as digital signal processors and/or performed by dedicated hardware such as application specific integrated circuits (ASIC), e.g., hard-wired electronic or logic circuits or programmable logic devices, or other hardware or software implementations.

The smart-card reader 306 can be used for reading cards inserted therein. For example, a license or identification can be embedded in the card and communicated to the controller 302 and/or the rights assignment engine 310. LCD display 304, the smart card reader 306, keypad 308 and software interfaces constitute a user interface of creation device 300. The user interface permits a user to input information such as identification data, and access requests and provides feedback as to operation of creation device 300. The content creation device 300 of the preferred embodiment is a video recorder, however, it can be any type of recording device, or content creation device for example, a still-image camera, an animation generator, an audio recorder, a text processor, or the like.

The rights assignment engine 310 can be accessed via the cable connection 313. For example, a rights assignment computer of a digital rights management (DRM) system, as described in further detail below, can be coupled to the rights assignment engine 310 via cable connection 313 to download a usage rights label or template, similar to the label described above, indicating usage rights for content to be created by the content creation device 300 in the future. Any content created by the content creation device 300 will automatically be associated with the usage rights label or labels stored in rights assignment engine 310. Alternatively, the usage rights label can be composed using the user interface of creation device 300. In either case, one or more labels and corresponding keys generated and stored in rights assignment engine 310 along with instructions indicating how the labels are to be assigned to content created by creation device 300.

The instructions can cause the usage rights labels to be assigned in any manner and can include any permissions and/or restrictions. For example, in the case of a video recorder, each part of the video sequence or frames can selectively be assigned different rights. This makes the rights assignment process very flexible and dynamic and permits rights assignment to be made in real time as content is created or prior to creation.

The content creation device 300 can utilize a unique device ID, a user's smart card, PKI technology, a PIN, or any biometrics system to assign rights based on the identity of the user, the recording device itself, the data on the smart card, or the like. For example, fingerprint recognition sensors 316, 318 or iris recognition sensor 312 can be used for recognition or authentication of the user's identify to permit rights assignment engine 310 to use a corresponding set of rights associated with the user. For example, all content recorded by person A will have one set of rights and all content recorded by person B will have a different set of rights. Of course, all these features, for example, fingerprint recognition sensors 316, 318 or iris recognition sensor 312, are optional features and content creation device 300 may be operated in a more conventional manner in other embodiments.

The content creation device 300 records content in a conventional manner. However, labels and keys generated in steps 100 and 110 described above are stored and associated with content recorded by content recorder 300 during or soon after recording. Accordingly, steps 140 and 150 described above are also accomplished by content creation device 300. For security purposes, a token or pre-paid card (or magnetic card and smart card, or any of its variations, such as memory-type or synchronous communication card, ISO 7816-compliant card, EMV-type card) can be used for the storage of fees and micro-payments, or keeping track of those fees with associated rights. Such cards can be read using the smart card reader 306. Again, however, these features are optional features and content creation device 300 may be operated in a more conventional manner in other embodiments.

It can be seen that the invention permits usage rights for a work to be created and associated with content prior to the creation of the content, the usage rights defining how the future digital work may be used and distributed. These pre-established usage rights become part of the future digital work and control the manner of use of the content of such work.

In the preferred embodiment, after the rights have been established for future content, a private key associated with the future content is assigned and a rights label is generated. This private key, along with the rights label, is stored. A user can purchase the content (present or future) after the label has been inserted into the main server. After the content is purchased, the content owner can get a license for encryption which contains the public key encrypted by a private key. Alternatively, a single symmetric key can be used.

The preferred embodiment allows a newspaper editor, for example, to send a camera crew to record content without worrying about the pictures being compromised in any way (for example, altered, edited, viewed by unauthorized personnel, or hidden and separately sold to another newspaper organization). In fact, the camera crew may have no rights whatsoever in the content as soon as the content is recorded.

Alternatively the editor can set the rights in such a way that the first 10 pictures, for example, will belong to the newspaper (work-related), and the next five pictures will belong to the cameraman (for personal use). This example illustrates the flexibility, security, confidence, certainty, and multiple relationships that can be arranged between parties (the cameraman and the editor in this example).

All future content may be assigned a content ID prior to existence of the content. Given the content ID information and the license for encryption, the content can be encrypted after creation in a manner that is available to be used by the users who have purchased the license. However, if the content ID information and the license for encryption are not available, access to the content shall be denied.

Further, a predetermined symmetric key can be generated in advance of content creation, and stored with the rights label. Afterwards, the same key can be used to encrypt the content once it is created. However, as noted above every user can receive a different key. In another alternative, the user can be given an authorization token, which the user can exchange for the license later on.

The controller 302 can process the security parameters and the rights management steps. Lost-card verification, lost-card reports, card-usage reports, security alert reports, and tracking reports can be associated or combined with the rights management reports, such as reports for revoked rights, denied rights, renewed rights, usage patterns, and micropayments.

The distribution, accounting, and other functions of the distributor and clearinghouse can be accomplished by any party on any device. For example, the content can be rendered on an ebook reader or PDA in response to entry of a code or insertion of a smartcard into a reader and accounting can be accomplished when the digital work or accounting data is returned to a specific source. The division of tasks disclosed herein is only an example. Usage rights and or accounting data can be encapsulated with the digital work or can be stored separately. Code for rendering, decrypting, or otherwise permitting or limiting use of the content can be stored on any device or can be encapsulated with the digital work. Any distribution arrangement can be used with the invention and such arrangements can include any combination of devices, such as personal computers, servers, PDAs, and the like communicating with one another in any manner as is necessary to transfer the desired information.

Figure 6:
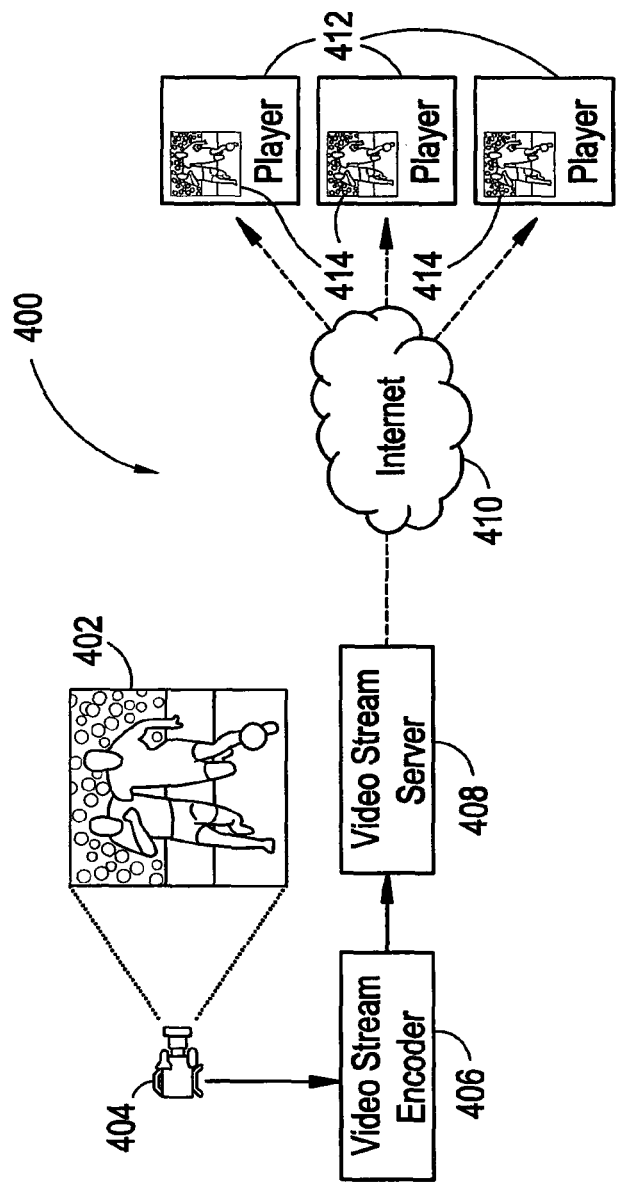
FIG. 6 is a schematic illustration of a conventional streaming media system.

FIG. 6 is a schematic illustration of a streaming media system 400 for streaming an event 402, such as a soccer match shown, or any other event. The media system 400 includes a capturing device which in the illustrated example, is a video camera 404 that captures event 402 and provides a video stream thereof. The video stream from the video camera 404 is received by an encoder device such as a video stream encoder 406 that converts the video stream into a streaming format such as Quicktime™, Real Media™ or Windows Media Player™. The converted video stream is provided to a streaming server 408 that serves the content via a network such as the Internet 410 to end users 412. The content is then viewed by the end users 412 using rendering application(s) that displays the video content on a display device 414. However, the streaming media system 400 does not allow protected distribution of the event 402 since a license is not required to view the event 402. Correspondingly, the streaming media system 400 also does not allow distribution of protected content. In addition, streaming media system 400 does not allow distribution of protected content if the content does not yet exist, such as is the case where the event is to occur in the future.

Figure 7:
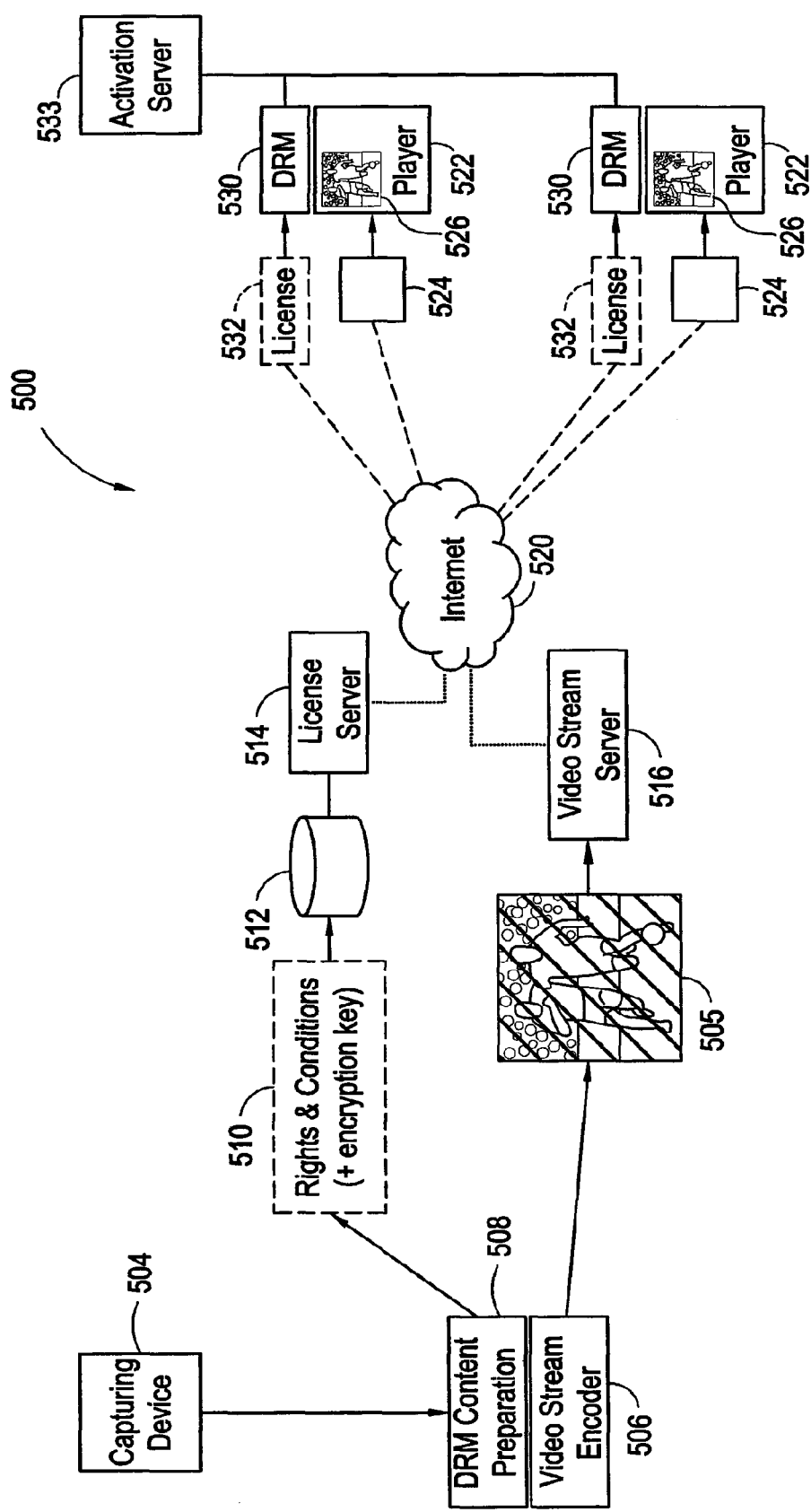
FIG. 7 is a schematic illustration of a DRM enabled streaming media system in accordance with one embodiment of the present invention.

Therefore, in accordance with one embodiment of the present invention, DRM-enabled streaming media system 500 is provided as shown in FIG. 7 where the streaming media, for instance, a video stream, is protected, and a license is required to view or access the content thereby allowing protected distribution of the content. It should be initially noted that whereas the terms "server" and "system" are used herein to describe the devices for implementing the present invention in the illustrated embodiments above, these terms should be broadly understood to mean any appropriate device for executing the described function, such as a personal computer, hand held computer, PDA, or any other general purpose programmable computer or combination of such devices, such as a network of computers. In addition, as previously noted, "content" can be a human readable or computer readable content, a text file, a code, a document, an audio file, a video file, a digital multimedia file, or any other content.

In the DRM-enabled streaming media system 500, the event is captured by the capturing device 504, thereby providing the content to be protected. The capturing device 504 may be a video camera of the type previously described relative to FIGS. 5 or 6. The capturing device 504 provides captured video stream to a content preparation device 508 and a video stream encoder 506. The video stream encoder 506 is preferably integrated with the content preparation device 508 as shown.

The DRM content preparation device 508 which may be similar to the rights assignment engine 310 described relative to FIG. 5, generates a rights label 510 associated with the content to be created. The rights label 510 includes various rights associated with particular content, conditions that must be satisfied to access the content, and a content encryption key needed to decrypt the content. The rights label 510 is stored in a database 512 controlled by a license server 514. The license server 514 is adapted to issue licenses 532 based on offers selected from the rights label 510 for allowing use of protected content in the manner described further below. In addition, a video stream encoder 506 encrypts the content so that it becomes encrypted content 505 which is protected in the sense that content must be decrypted in order to use the content. Preferably, the video format is preserved even through encryption. The encrypted content 505 is provided to a video stream server 516 that hosts the encrypted streamed content. The video stream server 516 provides the encrypted content 505 to a network such as the Internet 520 to allow distribution to remote users 522.

Rendering devices 526 can, upon activation by an activation device such as the activation server 533, process the licenses 532 issued by the license server 514. The rendering application 524 is preferably integrated with the rendering devices 526 used by the users 522. The rendering application(s) 524 may be Quicktime™, Real Media™ or Windows Media Player™ that allow display of video content on rendering device 526, or other appropriate rendering application.

The activation server 533 is preferably used to generate public-private key pairs for the users 522 of the DRM system 500. Activation provides a means for authenticating the users 522 via presentation of an issued public key provided during the activation process. During the generation of the licenses 532, the public key of the users 522 received during the activation process are retrieved. The content encryption key provided in the rights label 510 is then encrypted using the user's public key and delivered in the licenses 532. The only way to decrypt the content encryption key provided in the rights label 510 is by using the user's private key received during the activation process. Furthermore, the only way to decrypt the encrypted content is to use the decrypted content encryption key received in the rights label 510. When a user 522 attempts to view or play a video stream, a license 532 is issued by the license server 514 and sent to the DRM component 530 of the user 522. The license 532 contains the rights and content encryption key that may be decrypted using the user's private key to allow decryption of the encrypted content 505. Once the encrypted content 505 is decrypted, normal viewing of the content is attained using the rendering application 524. Thus, by encrypting the content as well as the encryption key required to decrypt the content, the DRM system 500 ensures that only authorized users are given access to the protected content.

Of course, depending on the specific implementation of the DRM system, other parties involved in the implementation of the DRM system 500 in addition to users 522 that actually consume content, may also need to be activated. For example, a point of capture that produces the content, content distributor, vendor such as a store front or an application that allows purchase and streaming of the content, may also need to be activated depending on the specific implementation in accordance with other embodiments.

Although the DRM system 500 shown in FIG. 7 discussed above can be used to support and distribute any type of protected content, the DRM system 500 shown, does not provide for assignment of rights to content that does not yet exist. Moreover, the DRM system 500 also does not provide for pre-distributing of licenses granting rights to view content before the existence of the content. Alternative embodiments of the DRM systems in accordance with the present invention discussed below address this limitation.

Figure 8:
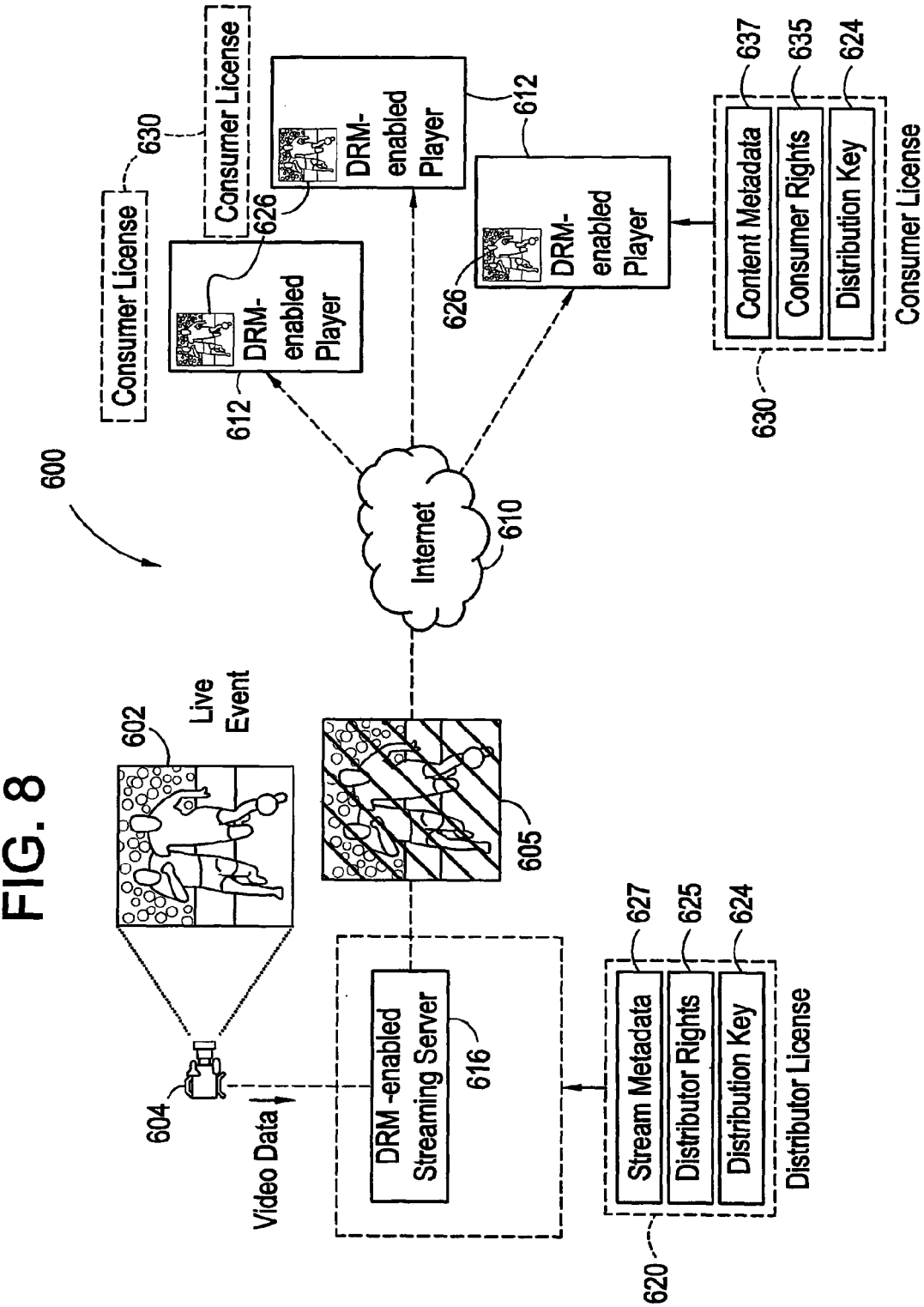
FIG. 8 is a schematic illustration of how the DRM system in accordance with one embodiment of the present invention is used to distribute a live event.

In particular, the preferred embodiment of a DRM system 600 in accordance with the present invention as schematically shown in FIG. 8 establishes a distributor license 620 with a distribution key 624 discussed in detail below to allow protection of content that does not yet exist such as a broadcast of a future live event, and also to allow the distribution of licenses in advance of the event. As seen in FIG. 8, a live event 602 is captured by capturing device such as a video camera 604, and captured video data is provided to a streaming device such as a streaming server 616. In accordance with the present embodiment, the streaming server 616 is authorized via a distributor license 620 to distribute the captured video stream as encrypted content 605 to users 612 via the Internet 610. The encrypted content 605 is decrypted by users 612 using consumer licenses 630 and video content is displayed on rendering devices 626 using a rendering application such as Quicktime™, Real Media™ or Windows Media Player™. It should be noted that in FIG. 8, various components of the DRM system 600 such as a content preparation device, video stream encoder, license server and activation server have been omitted for clarity. However, such components would function in a substantially similar manner as described relative to DRM system 500 of FIG. 7 discussed above.

As shown in FIG. 8, the distributor license 620 of the illustrated embodiment comprises a distribution key 624, distributor rights 625, and stream metadata 627. In a similar manner, the consumer license 630 of the illustrated embodiment comprises a distribution key 634, consumer rights 635, and content metadata 637. The distribution key 624 is a content encryption key that is generated in advance of the event, and is associated with the rights and conditions that will apply to the future broadcasted content. The distribution key 624 is stored as a component of a rights label in a license server as discussed in further detail relative to FIGS. 9 to 11 below. As will be evident to one of ordinary skill in the art in view of the teachings presented below, the distributor license 620 and the consumer license 632 are generated and issued to authorized end users prior to, or even during, the live event.

Figure 9:
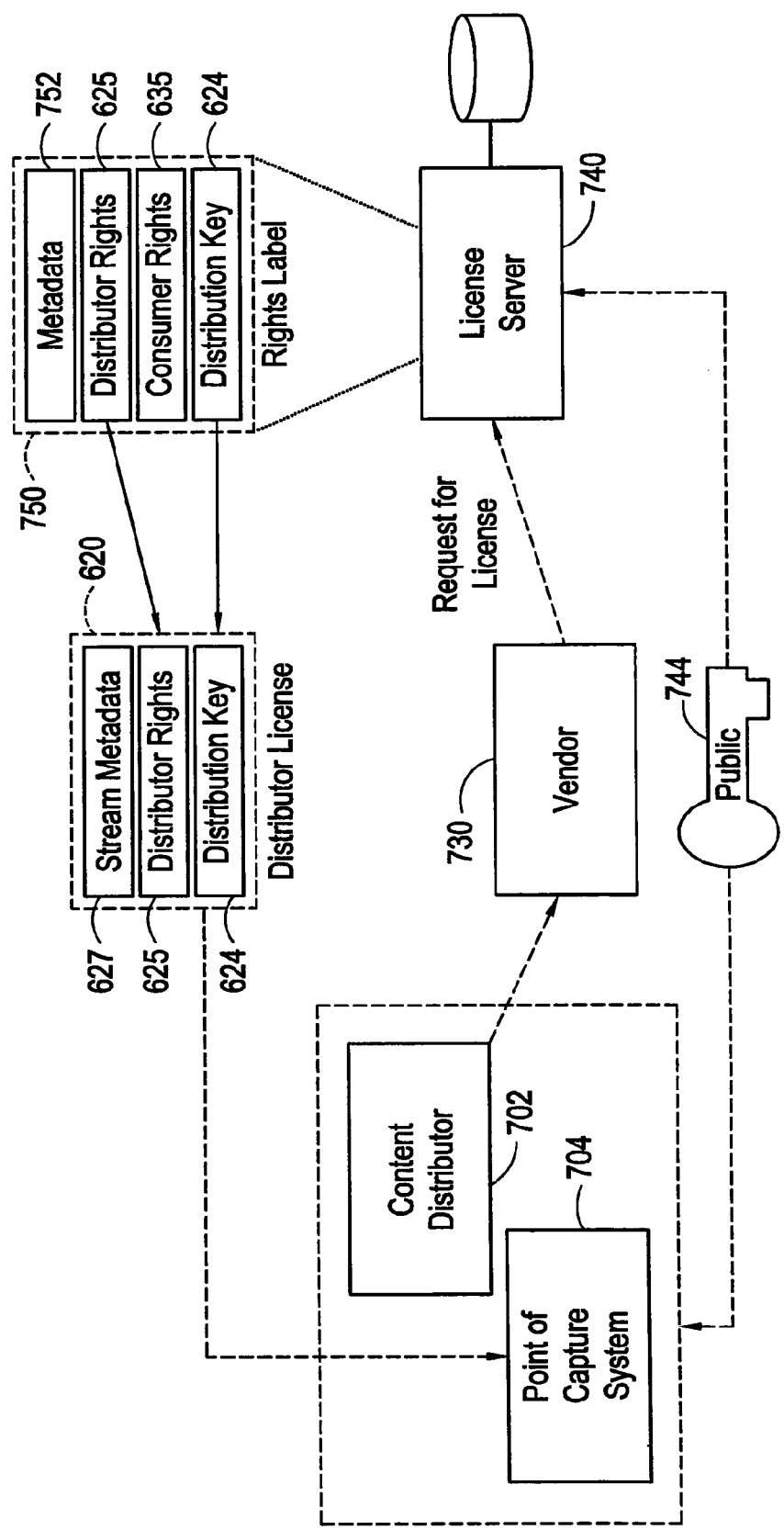
FIG. 9 is a schematic illustration showing the generation of a distribution license in accordance with one embodiment of the present invention.
Figure 10:
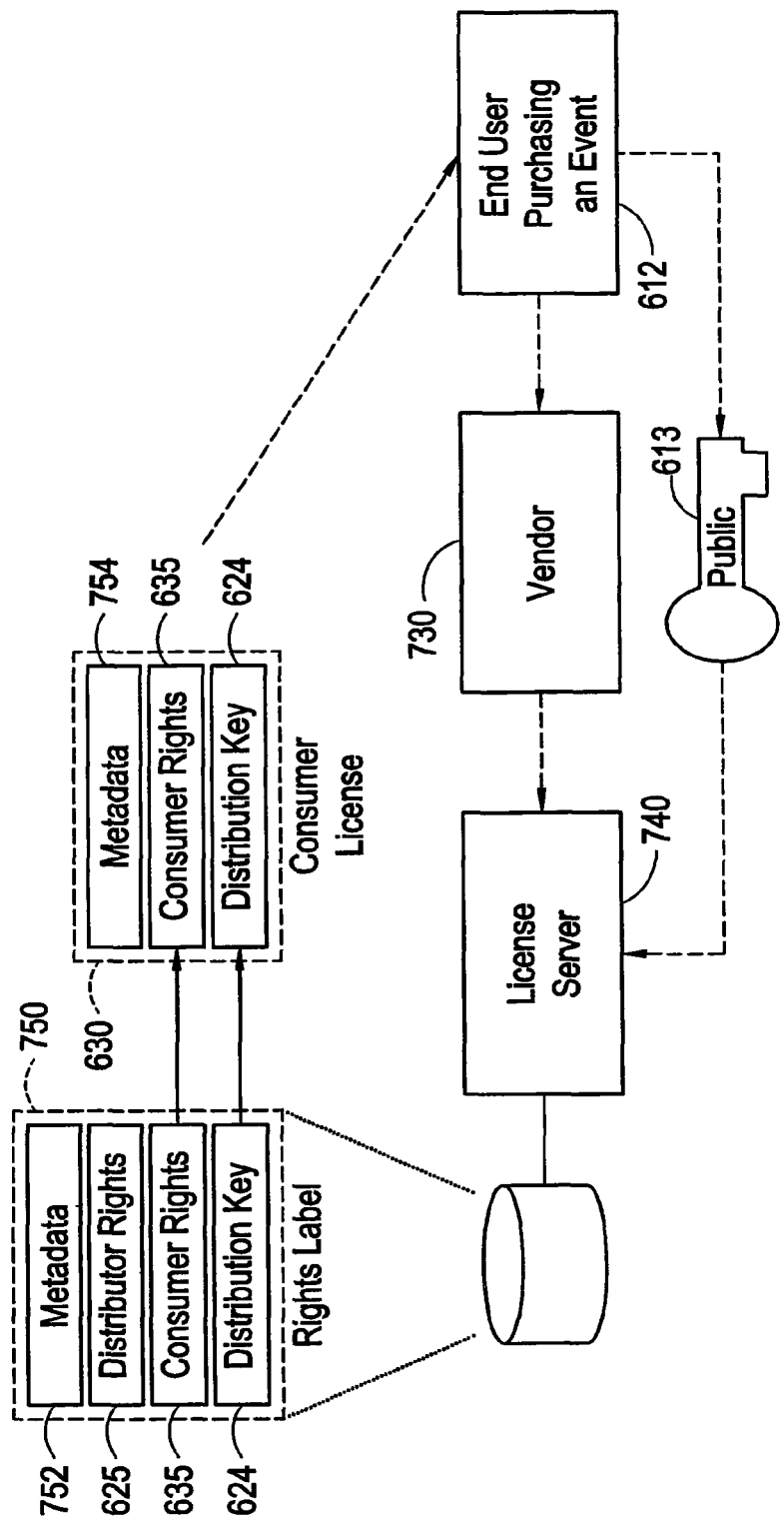
FIG. 10 is a schematic illustration showing the generation of a consumer license in accordance with one embodiment of the present invention.

FIG. 9 is a schematic illustration showing the generation and retrieval of the distributor license 620 of FIG. 8 in accordance with one embodiment of the present invention. As previously noted, the distributor license 620 can exist prior to the event to protect captured event content through encryption, and to distribute the protected content to the users 612. A content distributor 702 owns rights to the captured content, and in the present example, may be a broadcaster or the entity that owns the copyright for the broadcast. A point of capture system 704 is a system used to capture the event and prepare the content for distribution through a streaming device such as streaming server 616 discussed above. Point of capture system 704 may comprise a capturing device such as the video camera 504, the content preparation device 508, and/or the video stream encoder 506 discussed previously relative to FIG. 7. These components have been omitted in FIG. 9. Of course, in other embodiments, alternative appropriate devices may also be used.

It should also be noted that the point of capture system 704 which captures the event can be directly associated with the content distributor 702 as shown in FIG. 9, for instance, where the content distributor 702 controls or owns the point of capture system 704. However, in other embodiments, the point of capture system 704 may be a separate entity not associated with the content distributor 702.

A vendor 730 runs a web site, such as an on-line store front, where access to the event is sold and/or otherwise obtained by users. After some transaction by an end user such as log-in, payment, etc., a request to use protected content associated with a future event is made. The content distributor 702, the vendor 730 or equivalent, requests issuance of an appropriate distribution license 620 associated with the requested future event to the license server 740.

The license server 740 is provided with a public key 744 from the point of capture system 704, and is responsible for issuing both the consumer license 630 and the distribution license 620 from the rights label 750 stored in the license server 740. The rights label 750 includes metadata 752, distributor rights 625, consumer rights 635, and the distribution key 624 as shown. In a manner similar to that previously described, the distribution key 624 itself is encrypted using the public key 744 from the point of capture system 704. Thus, the distribution key 624 itself, must be decrypted so that the distribution key 624 can be used to decrypt protected content. Further details regarding generation of the distribution key 624 is discussed relative to FIG. 11. Metadata 752 is included in the rights label 750 that may be used for authentication purposes. The distributor rights 625 may include meta-rights such as rights to offer, grant, obtain, transfer, delegate, track, surrender, exchange, and revoke usage rights to/from others. Meta-rights can also include the rights to modify any of the conditions associated with other rights. For example, a meta-right may be the right to extend or reduce the scope of a particular right or the validation period of a right.

As shown, the distribution key 624 and the distributor rights 625 of the rights label 750 are used to generate the distributor license 620, the distributor license 620 being completed by inclusion of a stream metadata 627. In the present example, the distributor license 620 is provided to the content distributor 706 to allow distribution of the content, and to point of capture system 704 to allow encryption of the content. In this regard, the distribution license 620, and in particular, the distribution key 624 in the generated distribution license 620, is used to encrypt the captured event by the point of capture system 704, for instance, video or audio stream of the event.

The actual locale where the protection occurs depends on the implementation of the point of capture system 704. In the example where the DRM system in accordance with the present invention is used to encrypt a video stream, the encryption of the video stream may occur anywhere along the stream creation workflow prior to distribution via the Internet 610 of FIG. 8, or other distribution channel. Additional security measures such as protection of the video data from the capturing device 604 to the streaming server 616 may also be provided.

FIG. 8 illustrates generation of the consumer license 630 shown in FIG. 8 in accordance with one embodiment of the present invention, the consumer license 630 being required for users to use the protected content such as to view video stream of an event. Typically, in implementing a DRM-enabled distribution system in accordance with the present invention, an end user 612 seeking to purchase protected content accesses the vendor 730, which may be an on-line storefront or a web site. As previously noted, the vendor 730 provides the access point for consumers such as end users 612 to purchase content which is not yet available, but will be available at a predetermined date, for instance, a future event.

When attempt is made by the end user 612 to purchase protected content, the public key 613 of the end user 612 which was previously obtained through an activation process, is sent to the license server 740. The license server 740 uses the public key 613 to encrypt the distribution key 624 required to decrypt the protected content, and generates the consumer license 630 using components of the rights label 750. In particular, the consumer rights 635 and the distribution key 624 are used to generate the consumer license 630, the consumer license 630 being completed by inclusion of the metadata 754 that may be used for authentication purposes. The license 630 can then be downloaded by the end user 612 and used for accessing the scheduled future event.

The above described process for obtaining a consumer license 630 by the end user 612 is somewhat similar to conventional DRM systems. However, in contrast to conventional DRM systems, the obtained consumer license 630 cannot be used for any present content, but instead, serves as a "ticket" for a future event which may be a live event. The consumer license 630 is generated in accordance with the consumer rights 635 that have been specified to the end user 612. Thus, in the manner described above, the license server 740 of the preferred embodiment makes a distinction between the rights specified for the distributor and the rights specified for the consumer to generate a distributor license 620 or a consumer license 630 accordingly.

Figure 11:
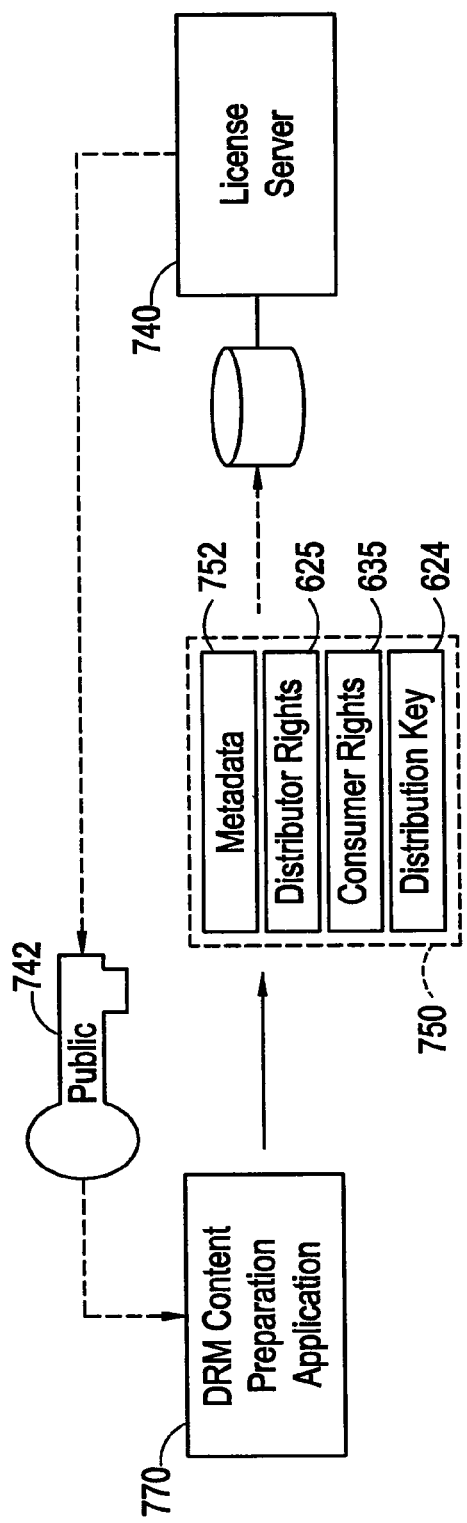
FIG. 11 is a schematic illustration showing the generation of a distribution key in accordance with one embodiment of the present invention.

FIG. 11 is a schematic illustration showing the generation of the distribution key 624 that is a component of the rights label 750 in accordance with one embodiment of the present invention. The distribution key 624 is required for generating the distribution license 620 and the consumer license 630 which are necessary for distributing and allowing use of protected content that is to occur in the future, such as a future event. Through a software application, the content distributor 702 initially creates the distribution key 624, which is a symmetric encryption key. The distribution key 624 is protected from tampering by encrypting it with the license server's 740 public key 742 so that only the license server 740 will be able to decrypt the distribution key 624. In this regard, the distribution key 624 is preferably stored in the license server 740 in order to provide better security and to track its use.

Moreover, as previously noted, additional metadata 752 is created and stored in the rights label 750. This metadata 752 is later inserted into the header information of the video stream that is generated by the point of capture system 704 during the live event. This metadata 752 may be used by the end users 612 to authenticate the issued licenses. The rights label 750 is transferred and stored in the license server 740 and may also be updated therein. The distribution key 624 is then issued as a component of the distributor license 620 and/or the consumer license 630 to a distributor and/or end user 612, respectively, in the manner described relative to FIGS. 9 and 10. The above described process is somewhat similar to processes used in conventional DRM systems except that the distribution key 624 is not immediately used to protect or use content, but it is saved for later use when the protected content is to be distributed closer to the time of the actual future event.

The following describes an example workflow that may be used to operate a DRM system in accordance with one embodiment of the present invention as applied to protected distribution and viewing of a future event. Thus, FIGS. 7 to 11 and various components identified therein should be referenced to facilitate understanding of the workflow. Initially, the content distributor 702 decides to offer a future event for sale, for instance, a future sporting event. The content distributor 702 creates the distribution key 624 which is a symmetric encryption key. The distribution key 624, together with additional information including distributor rights 625 and metadata 752 is encoded in rights label 750. The rights label 750 is then transferred to the license server 740 at which the consumer rights 635 is also added to the rights label 750.

The vendor 730 which may be a storefront or a web site, offers for sale the right to view the future event. End user(s) 612 desiring to use or otherwise view the future event, accesses the vendor 730 via the Internet 610 to purchase, or otherwise obtain, the right to view the future event. During the purchasing transaction, the vendor 730 interacts with the license server 740 to generate the consumer license 630 in the manner described above relative to FIG. 10 from rights label 750 so that the end user 612 can download the consumer license 630 to the user's 612 rendering device 626 or any other appropriate device such as a computer, hand held device, etc. for future use in viewing the event.

During this time when the right to view the future event is offered for sale via the vendor 730, but prior to the start of the actual event, the content distributor 702 requests for the distributor license 620, which is issued by the license server 740 in the manner described above relative to FIG. 9. The distributor license 620 is then used by the point of capture system 704 to protect the content while capturing the live performance of the event, for instance, the sporting event 602. The point of capture system 704 processes the video data from the capturing device 604 on-the-fly, and transmits now protected content 605 to the streaming server 616.

Once the distribution license 620 and the consumer license 630 are issued, the event can be securely distributed and consumed by authorized audience, i.e. end users 612. The streaming server 616 provides now protected content 605 through the Internet 610, or other appropriate distribution mechanism, to every user 612 that has purchased the right to view the event. User 612 decrypts the encrypted distribution key 624 provided in the consumer license 630 to decrypt the protected content 605. User's 612 rendering device 626 (FIG. 8) includes a rendering application such as Quicktime™ Real Media™ or Windows Media Player™ so that user 612 can view the event.

The preferred embodiment as described above can be used in a subscription model (for example, for magazine or marketing reports) in which the future issues of the content have not been published, but the rights for those issues have already been assigned and stored. At an appropriate future time, the rights will be associated with the corresponding content. By selling the content of a future event through a vendor such as a web site before the actual event, the traffic of the web site or other distribution device can be drastically reduced and distributed over a longer period of time, making the requirements for the servers and the web site easier to satisfy and less expensive to operate. Note, however, that the entity selling the rights or tickets, i.e. the license, might be different from the entity providing the content later on.

It should again be understood that whereas the terms "server" and "system" are is used to describe the devices for implementing the present invention in the illustrated embodiments above, these terms should be broadly understood to mean any appropriate device for executing the described function, such as a personal computer, hand held computer, PDA, or any other general purpose programmable computer or combination of such devices, such as a network of computers. Communication between the various devices can be accomplished through any channel, such as a local area network (LAN), the Internet, serial communications ports, and the like. The communications channels can use wireless technology, such as radio frequency or infra-red technology. The various elements of the preferred embodiment such as the various devices and components are segregated by function for the purpose of clarity. However, the various elements can be combined into one device or segregated in a different manner. For example, the software package and/or licenses can be a single executable file and data files, or plural files or modules stored on the same device or on different devices. The software package can include any mechanism for enforcing security and need not include a rendering application or the like.

Any protocols, data types, or data structures can be used in accordance with the invention. Moreover, any appropriate means of expressing usage rights and conditions may be used in implementing the present invention. For instance, as previously noted, a rights language grammar such as XrML™ can be used. In addition, software using objects or an object-oriented software development environment may be used that provides portable source code that can be used on a variety of computer hardware platforms. For example, the software used in implementation of the present invention can be written in the JAVA™ language and run in a JAVA™ virtual machine. Alternatively, the disclosed operations may be implemented partially or fully in a hardware using standard logic circuits or VLSI designs. The hardware can include any type of general purpose computer, dedicated computer, or other devices.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications within the scope of the appended claims and legal equivalents.

We claim:

1. A computer-implemented method executed by one or more computing devices for controlling use of future content, the future content being a recorded representation of a future event, the method comprising:

receiving, by at least one of the one or more computing devices before the future content is available, at least one rights offer associated with the future content, the at least one rights offer including at least one usage right specifying a manner of use of the future content that is enforceable by a repository;

selecting, by at least one of the one or more computing devices before the future content is available, one of the usage rights included in the rights offer;

requesting, by at least one of the one or more computing devices before the future content is available, generation of an authorization token associated with the future content, the authorization token being exchangeable for a right to access the future content when the future content becomes available and usable to authorize the granting of the selected usage right;

transmitting, by at least one of the one or more computing devices, device information and information identifying the authorization token, wherein the device information can be used to authenticate at least one of the one or more computing devices;

receiving, by at least one of the one or more computing devices, an indication that the future content is available, wherein use of the future content in accordance with the selected usage right is controlled by a software application installed on at least one of the one or more computing devices; and receiving, by at least one of the one or more computing devices, a data stream representing the future content, wherein the software application processes the data stream in accordance with the selected usage right.

2. The method of claim 1, wherein the at least one rights offer includes a right to render the data stream representing the future content.

3. The method of claim 1, wherein the at least one rights offer includes a right to store the data stream representing the future content and render the stored content.

4. The method of claim 1, wherein the selected usage right is specified in a license.

5. The method of claim 1, wherein the future content becomes available upon the occurrence of the future event.

6. The method of claim 1, wherein the software application is stored in a storage of at least one of the one or more computing devices.

7. The method of claim 1, wherein at least one of the one or more computing devices is operated within a streaming media system.

8. The method of claim 1, wherein the future content is available in plurality of formats, and wherein the step of selecting further includes selecting, by at least one of the one or more computing devices, a format appropriate for at least one of the one or more computing devices.

9. An apparatus for controlling use of future content, the future content being a recorded representation of a future event, the apparatus comprising:

one or more processors; and one or more memories operatively coupled to at least one of the one or more processors and having instructions stored thereon that, when executed by at least one of the one or more processors, cause at least one of the one or more processors to:

enable the receipt, before the future content is available, of at least one rights offer associated with the future content, the at least one rights offer including at least one usage right specifying a manner of use of the future content that is enforceable by a repository;

select, before the future content is available, one of the usage rights included in the rights offer;

request, before the future content is available, generation of an authorization token associated with the future content, the authorization token being exchangeable for a right to access the future content when the future content becomes available and usable to authorize the granting of the selected usage right;

transmit device information and information identifying the authorization token, wherein the device information can be used to authenticate the apparatus;

enable the receipt of an indication that the future content is available, wherein use of the future content in accordance with the selected usage right is controlled by a software application installed on the apparatus; and enable the receipt of a data stream representing the future content, wherein the software application processes the data stream in accordance with the selected usage right.

10. The apparatus of claim 9, wherein the at least one rights offer includes a right to render the data stream representing the future content.

11. The apparatus of claim 9, wherein the at least one rights offer includes a right to store the data stream representing the future content and render the stored content.

12. The apparatus of claim 9, wherein the selected usage right is specified in a license.

13. The apparatus of claim 9, wherein the future content becomes available upon the occurrence of the future event.

14. The apparatus of claim 9, wherein the software application is stored in a storage after it is received.

15. The apparatus of claim 9, wherein the apparatus is operated within a streaming media system.

16. The apparatus of claim 9, wherein the future content is available in plurality of formats, and wherein the step of selecting further includes selecting a format appropriate for the rendering device.

17. A computer-implemented method executed by one or more computing devices for controlling use of future content, the future content being a recorded representation of a future event, the method comprising:

receiving, by at least one of the one or more computing devices before the future content is available, a request to generate an authorization token associated with the future content, the authorization token being exchangeable for a right to access the future content when the future content becomes available;

generating, by at least one of the one or more computing devices before the future content is available, the authorization token, the authorization token being usable to authorize the granting of a selected usage right, the selected usage right specifying a manner of use of the future content that is enforceable by a repository, the selected usage right further being a usage right included in at least one rights offer associated with the future content;

receiving, by at least one of the one or more computing devices, device information and information identifying the authorization token, wherein the device information can be used to authenticate a rendering device;

transmitting, by at least one of the one or more computing devices, an indication that the future content is available, wherein use of the future content in accordance with the selected usage right is controlled by a software application installed on the rendering device; and transmitting, by at least one of the one or more computing devices, a data stream representing the future content, wherein the software application processes the data stream in accordance with the selected usage right.

18. The method of claim 17, wherein the at least one rights offer includes a right to render the data stream representing the future content.

19. The method of claim 17, wherein the at least one rights offer includes a right to store the data stream representing the future content and render the stored content.

20. The method of claim 17, wherein the selected usage right is specified in a license.

21. The method of claim 17, wherein the future content becomes available upon the occurrence of the future event.

22. The method of claim 17, wherein the rendering device is operated within a streaming media system.

23. The method of claim 17, wherein the future content is available in plurality of formats, and further comprising receiving, by at least one of the one or more computing devices, a selection of a format appropriate for the rendering device.

24. A system for controlling use of future content, the future content being a recorded representation of a future event, the system comprising:

one or more processors; and one or more memories operatively coupled to at least one of the one or more processors and having instructions stored thereon that, when executed by at least one of the one or more processors, cause at least one of the one or more processors to:

enable the receipt, before the future content is available, of a request to generate an authorization token associated with the future content, the authorization token being exchangeable for a right to access the future content when the future content becomes available;

generate, before the future content is available, the authorization token, the authorization token being usable to authorize the granting of a selected usage right, the selected usage right specifying a manner of use of the future content that is enforceable by a repository, the selected usage right further being a usage right included in at least one rights offer associated with the future content;

enable the receipt of device information and information identifying the authorization token, wherein the device information can be used to authenticate a rendering device;

transmit an indication that the future content is available, wherein use of the future content in accordance with the selected usage right is controlled by a software application installed on the rendering device; and transmit a data stream representing the future content, wherein the software application processes the data stream in accordance with the selected usage right.

25. The system of claim 24, wherein the at least one rights offer includes a right to render the data stream representing the future content.

26. The system of claim 24, wherein the at least one rights offer includes a right to store the data stream representing the future content and render the stored content.

27. The system of claim 24, wherein the selected usage right is specified in a license.

28. The system of claim 24, wherein the future content becomes available upon the occurrence of the future event.

29. The system of claim 24, wherein the rendering device is operated within a streaming media system.

30. The system of claim 24, wherein the future content is available in plurality of formats, and wherein at least one of the one or more memories has instructions stored thereon that, when executed by at least one of the one or more processors, cause at least one of the one or more processors to enable the receipt of a selection of a format appropriate for the rendering device.

* * * * *